United States Patent
Kim et al.

(10) Patent No.: US 9,951,678 B1
(45) Date of Patent: Apr. 24, 2018

(54) INTAKE AIR CONTROL DEVICE FOR VEHICLE

(71) Applicant: HYUNDAI MOTOR COMPANY, Seoul (KR)

(72) Inventors: Jin Ha Kim, Gunpo-si (KR); Seung Jae Kang, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/379,419

(22) Filed: Dec. 14, 2016

(30) Foreign Application Priority Data

Oct. 17, 2016 (KR) .......................... 10-2016-0134257

(51) Int. Cl.
*F02B 31/00* (2006.01)
*F02B 31/08* (2006.01)
(Continued)

(52) U.S. Cl.
CPC ............ *F02B 31/08* (2013.01); *B01D 46/006* (2013.01); *B01D 53/0454* (2013.01); *B01D 53/9422* (2013.01); *F01N 3/025* (2013.01); *F01N 3/0814* (2013.01); *F01N 3/0885* (2013.01); *F02M 35/1085* (2013.01); *F02M 35/10255* (2013.01); *F02M 35/16* (2013.01); (Continued)

(58) Field of Classification Search
CPC .......... F02B 31/04; F02B 31/06; F02B 31/08; F02M 35/10065; F02M 35/10255
See application file for complete search history.

(56) References Cited

U.S. PATENT DOCUMENTS

| | | | | |
|---|---|---|---|---|
| 6,006,718 A | * | 12/1999 | Ishihara | F02B 31/085 123/295 |
| 6,269,634 B1 | * | 8/2001 | Yokota | F01N 3/0842 123/300 |

(Continued)

FOREIGN PATENT DOCUMENTS

| JP | 2011-144727 A | 7/2011 |
|---|---|---|
| JP | 2011-220296 A | 11/2011 |

(Continued)

OTHER PUBLICATIONS

Office Action dated Nov. 8, 2017 in corresponding Korean Patent Application No. 10-2016-0134257—4 pages.

*Primary Examiner* — Thomas Moulis
(74) *Attorney, Agent, or Firm* — Knobbe Martens Olson & Bear LLP

(57) ABSTRACT

An intake air control device includes: an intake air flow channel that includes an air flow pipe furcated into multiple branch flow channels that communicate with the same combustion chamber; an intake air valve provided to the air flow pipe to adjust an opening degree of the air flow pipe in accordance with a rotation angle thereof; a swirl valve provided to any one of the multiple branch flow channels to adjust an opening degree of the branch flow channel in accordance with a rotation angle thereof; and a cam plate that is rotatable and has a first cam slot. The intake air valve has a first protrusion inserted in the first cam slot. The first cam slot has a first rotation section within which the first protrusion slides and rotates about the rotational shaft of the intake air valve in response to rotation of the cam plate.

15 Claims, 11 Drawing Sheets

(51) Int. Cl.
*B01D 53/94* (2006.01)
*F01N 3/08* (2006.01)
*F01N 3/025* (2006.01)
*F02M 35/10* (2006.01)
*B01D 53/04* (2006.01)
*B01D 46/00* (2006.01)
*F02M 35/16* (2006.01)
*F02M 35/108* (2006.01)

(52) U.S. Cl.
CPC ...... *B01D 2257/40* (2013.01); *B01D 2279/30* (2013.01); *F01N 2570/14* (2013.01); *F01N 2900/16* (2013.01)

(56) References Cited

U.S. PATENT DOCUMENTS 6,499,456 B1\* 12/2002 Nogi .................. F02B 1/12
123/295
8,662,054 B2\* 3/2014 Omura ............... F02D 41/0002
123/306
2001/0023677 A1\* 9/2001 Fujieda ................ F02B 17/005
123/295
2007/0204434 A1\* 9/2007 Kang ................... B60H 1/0065
16/361
2008/0271696 A1\* 11/2008 Tominaga ............... F02B 31/04
123/184.53
2009/0007874 A1\* 1/2009 Abe ....................... F02B 27/02
123/184.47
2014/0174401 A1\* 6/2014 Hattori ................... F02B 31/06
123/337
2015/0330340 A1\* 11/2015 Oiwa ................. F02B 27/0215
123/184.38

FOREIGN PATENT DOCUMENTS

| JP | 2012-57546 A | 3/2012 |
| KR | 1998-048331 A | 9/1998 |
| KR | 20-0152903 Y1 | 8/1999 |
| KR | 10-1241778 B1 | 3/2013 |
| KR | 10-2016-0038486 A | 4/2016 |

\* cited by examiner

# INTAKE AIR CONTROL DEVICE FOR VEHICLE

CROSS REFERENCE TO RELATED APPLICATION

The present application claims priority to Korean Patent Application No. 10-2016-0134257, filed Oct. 17, 2016, the entire contents of which is incorporated herein for all purposes by this reference.

BACKGROUND

1. Field

The present disclosure relates to an intake air control device for a vehicle and, more particularly, to an intake air control device for a vehicle, for controlling the amount of air taken in by an engine.

2. Description of the Related Art

An engine, e.g., diesel engine, is typically equipped with a plurality of combustion chambers and a plurality of flow channels through which air flows into each combustion chamber. The flow channel is provided with a valve that adjusts the flow rate of intake air by adjusting the cross section area of flow of intake air.

The amount of air introduced into each combustion chamber of an engine can be adjusted in accordance with driving conditions. To this end, a valve is used to adjust the amount of intake air. Therefore, proper adjustment of the flow rate of intake air introduced into combustion chambers is one of the important areas of study for developing efficient vehicles.

The disclosure of this section is to provide background of the invention. Applicant notes that this section may contain information available before this application. However, by providing this section, Applicant does not admit that any information contained in this section constitutes prior art.

SUMMARY

One aspect provides an intake air control device including: an intake air flow channel including an air flow pipe through which intake air flows, the air flow pipe being furcated into a plurality of branch flow channels that communicates with a same combustion chamber; an intake air valve provided to the air flow pipe and configured to adjust an opening degree of the air flow pipe in accordance with a rotation angle thereof; a swirl valve provided to any one of the plurality of branch flow channels and configured to adjust an opening degree of the branch flow channel in accordance with a rotation angle thereof; and a cam plate that is rotatably installed and is provided with a first cam slot, wherein the intake air valve is provided with a first protrusion in a position that is spaced from a rotational shaft thereof, the first protrusion being inserted in the first cam slot, and wherein at least a portion of the first cam slot serves as a first rotation section along which the first protrusion slides and within which the first protrusion rotates about the rotational shaft of the intake air valve in response to rotation of the cam plate, so that the intake air valve is rotated.

Each of the branch flow channels may be furcated into a plurality of sub-branch flow channels, and the sub-branch flow channels communicate with respective combustion chambers formed in an engine.

The first rotation section of the first cam slot may be shaped such that a distance from the rotational shaft of the cam plate to the first rotation section gradually varies according to positions in a longitudinal direction of the first rotation section, so that the first protrusion rotates while sliding along the first rotation section.

The first rotation section may be curved such that a rotation angle of the intake air valve, rotated by a sliding motion of the first protrusion, is in a predetermined ratio with respect to a rotation angle of the cam plate.

At least a portion of the first cam slot, other than the first rotation section, serves as a first non-rotation section along which the first protrusion slides but within which the first protrusion does not rotate. The first non-rotation section may be formed such that a distance from the rotational shaft of the cam plate to the first non-rotation section is constant at any position, for the entire range of the first non-rotation section in a longitudinal direction.

The swirl valve may be provided with a second protrusion in a position spaced from the rotational shaft of the swirl valve. The cam plate may be provided with a second cam slot in which the second protrusion is inserted. The second cam slot may include a second rotation section along which the second protrusion slides and within which the second protrusion rotates about the rotational shaft of the swirl valve in response to rotation of the cam plate, and a second non-rotation section along which the second protrusion slides but within which the second protrusion does not rotate.

The cam plate may be rotated in a first direction from a reference state in which the intake air valve and the swirl valve have a maximum opening degree. The first protrusion may be positioned within the first rotation section of the first cam slot, and the second protrusion may be positioned within the second non-rotation section of the second cam slot.

In the intake air control device for a vehicle, when the cam plate is rotated in a second direction from the reference state, the first protrusion may be positioned within the first non-rotation section of the first cam slot, and the second protrusion is positioned within the second rotation section of the second cam slot.

The first rotation section may be curved such that a rotation angle of the intake air valve, rotated by sliding motion of the first protrusion, is in a predetermined ratio with respect to a rotation angle of the cam plate, and the second rotation section may be curved such that a rotation angle of the swirl valve, rotated by sliding motion of the second protrusion, is in a predetermined ratio with respect to a rotation angle of the cam plate.

The intake air control device for a vehicle further includes: a driver unit that provides rotational force to the cam plate; and a controller that adjusts a rotation angle of the cam plate by controlling the driver unit, wherein in regeneration mode of a DPF device provided to an exhaust air flow channel, the controller may control the rotation angle of the cam plate such that the first protrusion slides along the first rotation section and the second protrusion slides along the second non-rotation section of the second cam slot, thereby adjusting an opening degree of the intake air valve and maintaining an opening degree of the swirl valve.

In a normal mode corresponding to a normal driving condition of a vehicle, the controller may control the rotation angle of the cam plate such that the first protrusion slides along the first non-rotation section of the first cam slot and the second rotation angle slides along the second rotation section of the second cam slot, thereby maintaining the opening degree of the intake air valve but adjusting the opening degree of the swirl valve.

At least a portion of the first cam slot, other than the first rotation section and the first non-rotation section, may serve as a third rotation section along which the first protrusion slides and within which the first protrusion rotates in response to the rotation of the cam plate, wherein the third rotation section is disposed between the first rotation section and the third rotation section.

When the cam plate is rotated in the second direction from the reference state in which the intake air valve and the swirl valve have a maximum opening degree, the first protrusion may be positioned within the first non-rotation section or the third rotation section of the first cam slot, and the second protrusion may be positioned within the second rotation section of the second cam slot.

The second rotation section, along which the second protrusion slides, may be curved with a predetermined curvature by which the rotation angle of the swirl valve is increased but an increase rate of the rotation angle is gradually decreased, as the rotation angle of the cam plate, rotated in the second direction from the reference state, is increased.

The intake air control device for a vehicle may further include: a driver unit that provides rotational force to the cam plate; and a controller that adjusts the rotation angle of the cam plate by controlling the driver unit, wherein in regeneration mode of an LNT device provided to the exhaust air flow channel, the controller adjusts the rotation angle of the cam plate such that the first protrusion slides through the first non-rotation section of the first cam slot and then slides along the third rotation section, and the second protrusion slides along the second rotation section of the second cam slot, thereby adjusting the opening degrees of both of the intake air valve and the swirl valve.

The intake air control device for a vehicle according to embodiments of the present invention has a simple structure and can effectively control a plurality of valves that is used to adjust the flow rate of intake air.

Specifically, the valves are operated in response to operation of a cam plate, so that flexibility in operation control of the valves is dramatically improved. For example, it is possible to adjust a ratio of a rotation angle of a driver unit with respect to a rotation angle of each valve or it is possible to hold the valve not to be rotated even while the driver unit is operating.

In addition, according to embodiments of the present invention, the cam plate is provided with a plurality of cam slots and the plurality of valves receives rotational force from their protrusions that slide along the cam slots. Therefore, the plurality of valves can be operated by one driver unit. For this reason, the intake air control device according to embodiments of the present invention has a simplified and lightweight structure.

In addition, the plurality of valves can be simply adjusted with use of a controller in accordance with driving conditions of a vehicle. Therefore, requirements for the flow of intake air can be satisfied in accordance with driving conditions of a vehicle.

BRIEF DESCRIPTION OF THE DRAWINGS

The above and other features and other advantages of the present invention will be more clearly understood from the following detailed description taken in conjunction with the accompanying drawings, in which.

DESCRIPTION OF EMBODIMENTS

Figure 1:
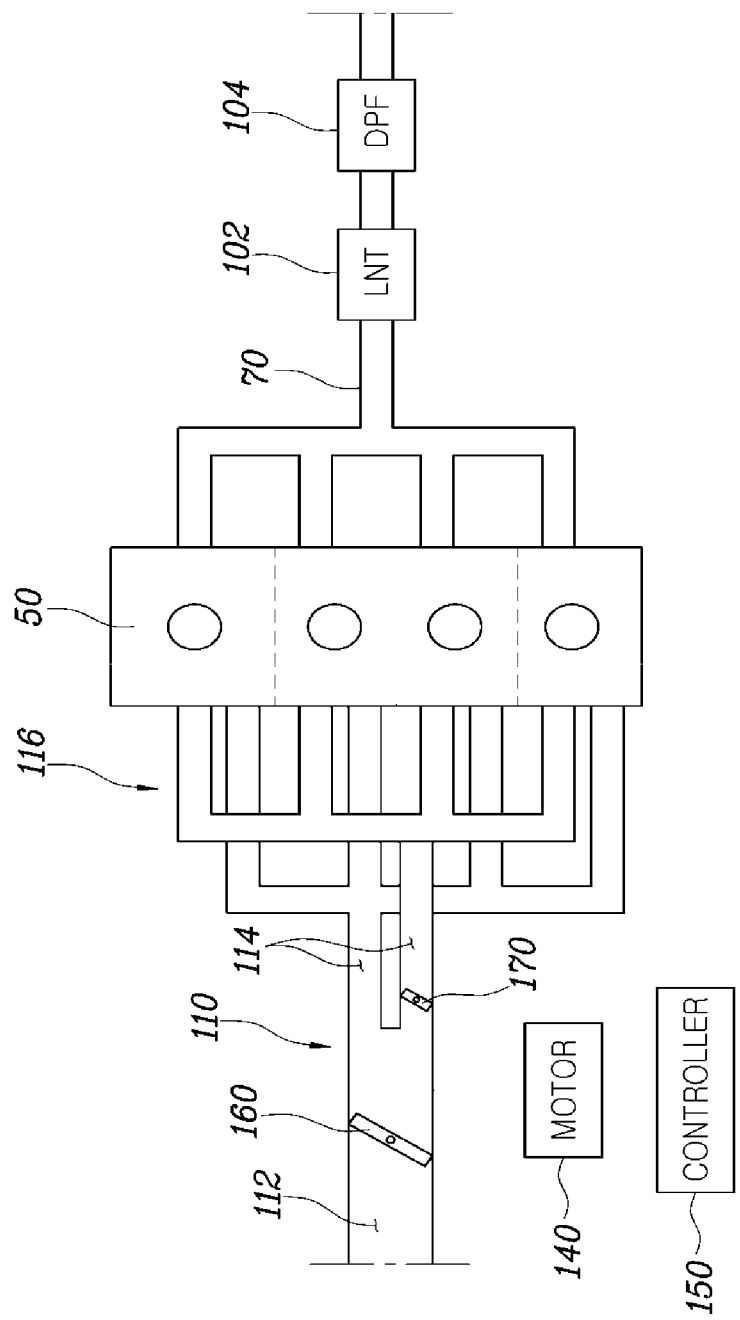
FIG. 1 is a schematic diagram illustrating an intake and exhaust system equipped with an intake air control device for a vehicle according to a first embodiment of the present invention.

Hereinafter, the embodiments of the present invention are described with reference to the accompanying drawings.

As illustrated in FIGS. 1 to 6, an intake air control device for a vehicle according to a first embodiment of the present invention includes: an intake air flow channel system 110 in which an intake air flow pipe 112 is furcated into a plurality of branch flow channels or branched pipes 114 that communicates with one combustion chamber together; an intake air valve 160 that is provided to the intake air flow pipe 112 and adjusts an opening degree of the intake air flow pipe 112 in accordance with rotation angles thereof; a swirl valve 170 that is provided to any one of the branch flow channels 114 and adjusts an opening degree of the corresponding branch flow channel 114 in accordance with rotation angles thereof; and a cam plate 200 that is rotatable and is provided with a first cam slot 210. In addition, the intake air valve 160 is provided with a first protrusion or a cam follower pin 166 that is inserted in the first cam slot 210 and is spaced from a rotational shaft 162 thereof. Further, at least a portion of the first cam slot 210 serves as a first rotation section 212 within which the first protrusion 166 slides and rotates about the rotational shaft 162 of the intake air valve 160 when the cam plate 200 is rotated. This operation results in rotation of the intake air valve 160.

This operation will be described in greater detail below.

As for the intake air flow channel 110, the intake air flow pipe 112 in which intake air flows is furcated into a plurality of branch flow channels 114 and all the branch flow channels 114 communicate with the same combustion chamber together.

The intake air flow channel 110 functions as a flow path of intake air that flows into an engine 50. The intake air flow channel 110 of embodiments of the present invention is provided with the intake air flow pipe 112 having an internal space, and the downstream side end of the intake air flow pipe 12 is furcated into the branch flow channels 114.

The intake air flow pipe 112 may be furcated in various ways. For example, a portion of the intake air flow pipe 112 is furcated into a plurality of pipes, or the intake air flow pipe 112 serves as a external pipe and a plurality of barrier ribs are provided in the external pipe to provide the branch flow channels 114 in the intake air flow pipe 112. In embodiments, the intake air flow pipe 112 can be furcated in various ways.

Figure 2:
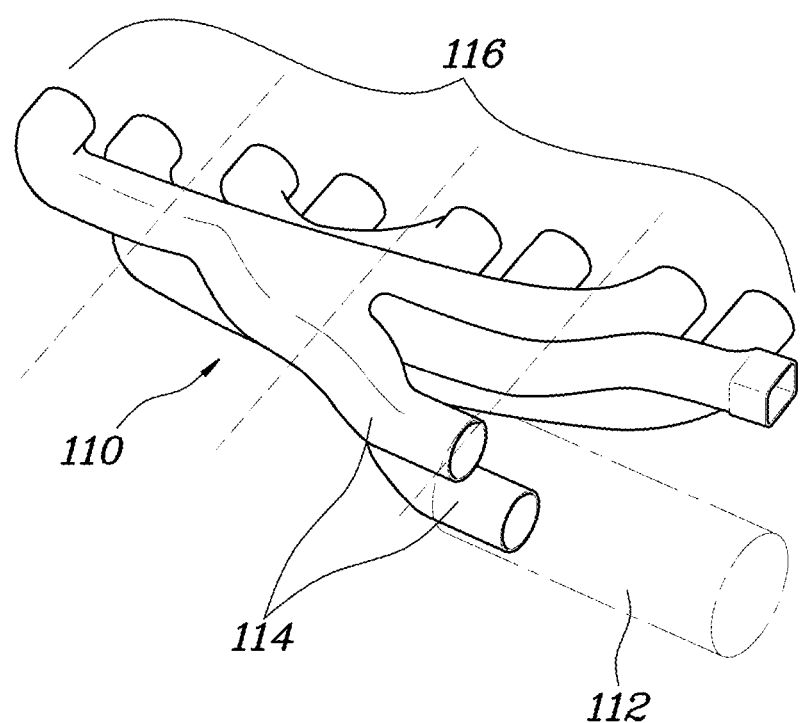
FIG. 2 is an intake air flow channel to be provided with the intake air control device for a vehicle according to the first embodiment of the present invention.

FIGS. 1 to 2 schematically illustrate the intake air flow pipe 112 that is furcated into the multiple branch flow channels 114. In the intake air flow channel 110 illustrated in FIGS. 1 to 2, the downstream end of the intake air flow pipe 112 is bifurcated to provide two branch flow channels 114.

The engine 50 may have a plurality of combustion chambers. The branch flow channels 114 communicate with the same combustion chamber together. Intake air that passes through each branch flow channel 114 is mixed in the combustion chamber.

The intake air valve 160 is provided to the intake air flow pipe 112. The opening degree of the intake air flow pipe 112 is determined in accordance with the rotation angle of the intake air valve 160. Herein, the intake air valve 160 is also referred to as ACV.

The intake air valve 160 adjusts the amount of intake air that flows through the intake air flow pipe 112 by adjusting the opening degree of the intake air flow pipe 112. The intake air valve 160 is available in various kinds and forms. However, the embodiment of the present invention suggests two kinds of valves respectively including valve plates 164 and 174 respectively provided with rotational shafts 162 and 172.

Figure 3:
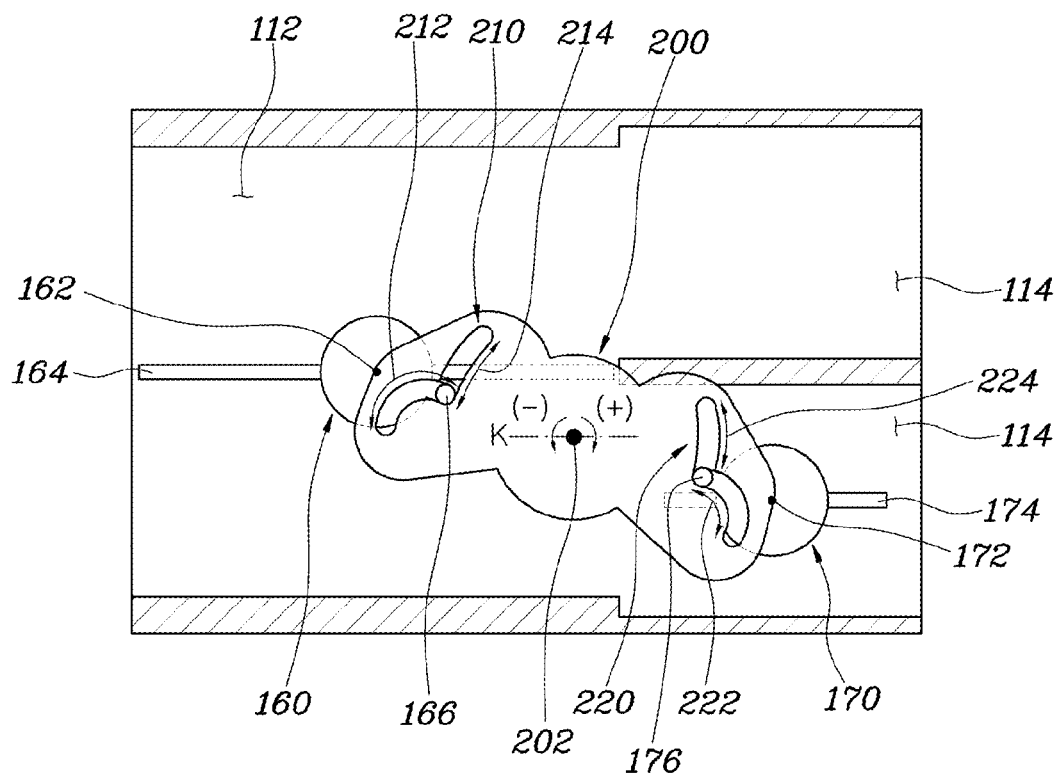
FIG. 3 is a diagram illustrating a reference state of the intake air control device for a vehicle according to the first embodiment of the present invention.
Figure 4:
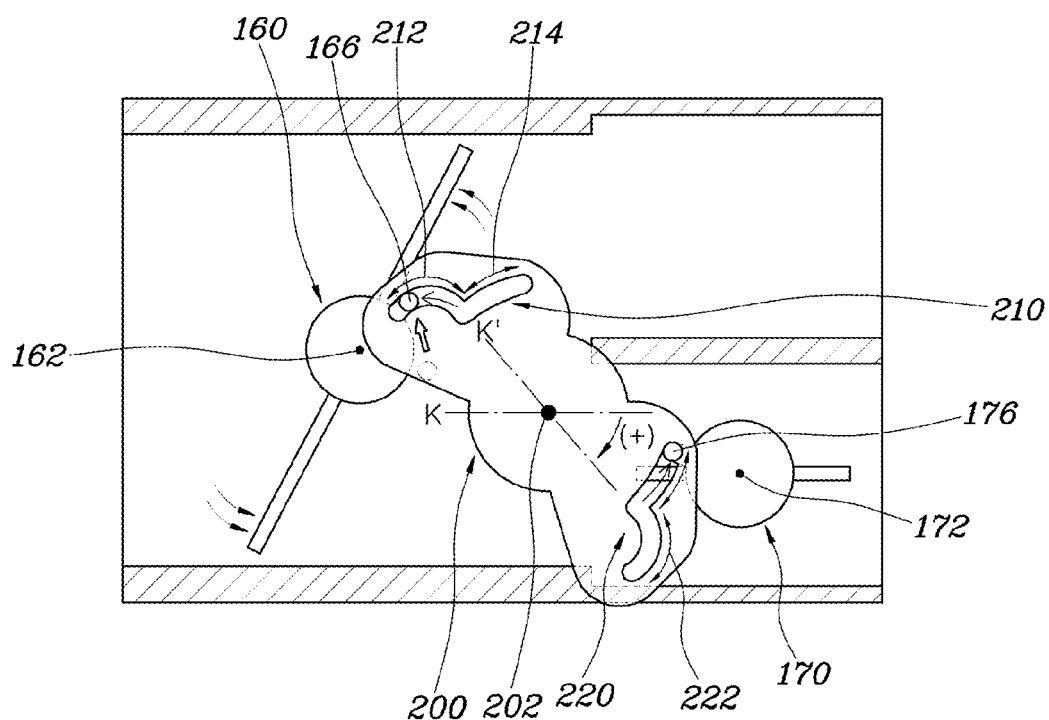
FIG. 4 is a diagram illustrating a controlled state of the intake air control device for a vehicle according to the first embodiment of the present invention, in which a cam plate is rotated in a first direction to adjust an opening degree of an intake air valve.
Figure 5:
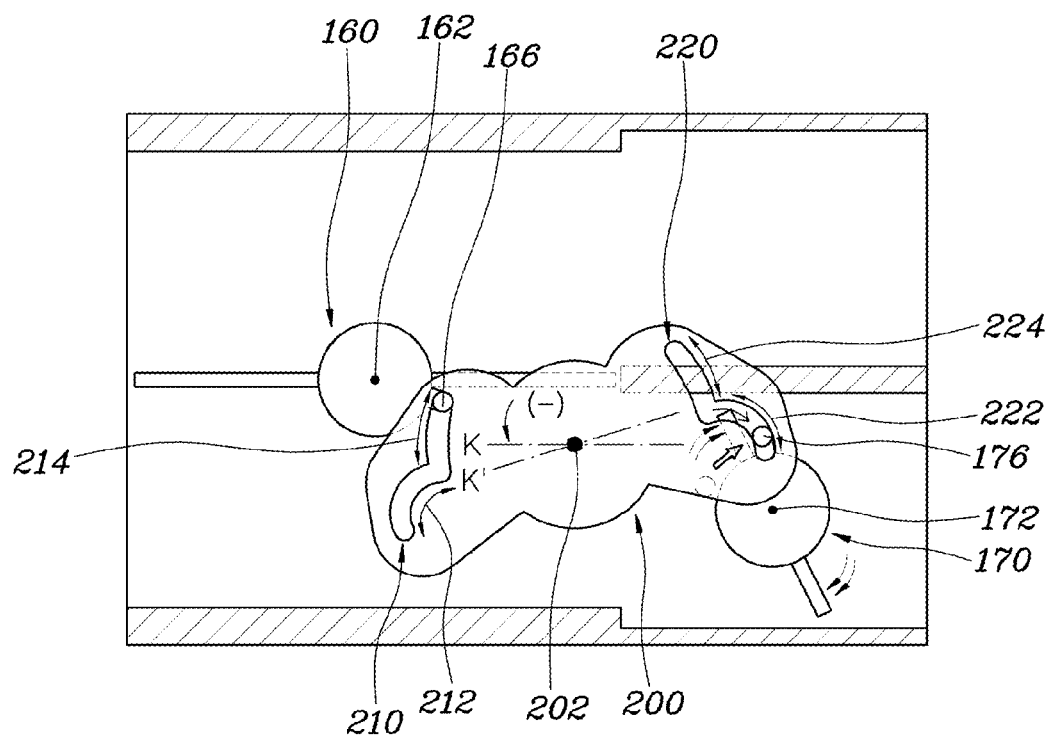
FIG. 5 is a diagram illustrating a controlled state of the intake air control device for a vehicle according to the first embodiment of the present invention, in which the cam plate is rotated in a second direction to adjust an opening degree of a swirl valve.

As one embodiment of the present invention, FIGS. 3 to 5 illustrate the intake air valve 160 and the swirl valve 170 that have respective valve plates 164 and 174 that are rotatable. The swirl valve 170 is also referred to as SCV herein.

Specifically, the intake air valve 160 or the swirl valve 170 is provided with the valve plate 164 or 174 that has a cross section area that is substantially the same as or similar to the flow area of intake air, in a position at which the intake air valve 160 or the swirl valve 170 is installed.

The valve plates 164 and 174 rotate about their own rotational shafts 162 and 172, respectively. When the valve plates 164 and 174 are aligned such that the longitudinal direction thereof is in parallel with the direction of the stream of the intake air, the air flow path is fully open, which means that the opening degree is largest.

In embodiments of the present invention, the term "opening degree" means how much the valve or the corresponding flow channel is open. As the opening degree is increased, the flow area of intake air is increased. Herein, the term "opening degree" may also be referred to as "closing degree" which means how much the valve or corresponding flow channel is closed. As the closing degree is increased, the flow area of intake air is decreased. That is, "opening degree" and "closing degree" are terms representing the same state from different perspectives. When a certain state is represented as the opening degree having a large value, the state also can be represented as the closing degree having a small value.

As the amount of rotation of the valve plate 164 or 174 is increased, the flow area of intake air is gradually decreased. In embodiments, the opening degree of the valve or flow path is decreased. This state can be rephrased as "the closing degree is increased".

According to embodiments of the present invention, the intake air valve 160 is provided to the intake air flow pipe 112. The intake air valve 160 of embodiments of the present invention is intended to adjust the flow rate of intake air that flows through the intake air flow pipe 112. FIG. 1 roughly illustrates an installation position of the intake air valve 160, and FIGS. 3 to 5 illustrate the cross section of the intake air valve 160 provided to the intake air flow pipe 112.

In embodiments of the present invention, a state in which the opening degree of the intake air valve 160 or the swirl valve 170 is largest is a state in which the longitudinal direction of the valve plate 164 or 174 is in parallel with the direction of the stream of the intake air. Herein, this state is defined as "reference state". In the reference state, the rotation angle of the intake air valve 160 or the swirl valve 170 is zero.

In embodiments, the intake air valve 160 and the swirl valve 170 illustrated in FIG. 3 are in the reference state in which the rotation angle is zero and the opening degree of the valves is largest.

Meanwhile, the swirl valve 170 is provided to any one of the branch flow channels 114, and is rotated by a certain rotation angle, thereby adjusting the opening degree of the branch flow channel 114.

Preferably, the intake air valve 160 is installed downstream of the intake air flow pipe 112, and the swirl valve 170 is installed upstream of the branch flow channel 114. Therefore, the intake air valve 160 and the swirl valve 170 are installed to be close to each other. This arrangement enables easy control on the valves because the rotation angles of the valves can be controlled in an interlocked manner.

The swirl valve 170 is similar to the intake air valve 160 in terms of types, shapes, and operations. The swirl valve 170 differs from the intake air valve 160 only in the point that the swirl valve 170 is installed on any one of the branch flow channel 114 instead of on the intake air flow pipe 112. Specifically, the swirl valve 170 functions to adjust the opening degree of any one of the branch flow channels 114.

The swirl valve 170 is used to swirl the intake air introduced into a combustion chamber. As previously described, the multiple branch flow channels 114 communicate with the same combustion chamber. When the opening degree of one branch flow channel 114 equipped with the swirl valve 170 is zero (i.e., the closing degree is largest)

only to block the stream of intake air, intake air only in the other branch flow channels 114 can be introduced into the combustion chamber.

In this case, the intake air introduced into the combustion chamber unstably flows in comparison with the case in which all of the branch flow channels 114 are open. For example, as illustrated in FIGS. 1 to 2, when there are two branch flow channels 114 and when all the intake air, flowing through the two branch flow channels 114, is introduced into the combustion chamber, the streams of the intake air are balanced in the combustion chambers. However, when only intake air in any one of the two branch flow channels 114 is introduced into the combustion chamber, since there is no stream of intake air in the other branch flow channel 114, the stream of intake air is disproportional in the combustion chamber. In embodiments, the intake air disproportionally and unstably flows.

In this case, the intake air is swirled in the combustion chamber due to the disproportional flow. For this reason, a valve provided to any one branch flow channel among the multiple branch flow channels 114 is referred to as "swirl valve". The directions and of streams of intake air introduced into the combustion chambers, or relative positions of the flow channels and valves can be diversely determined.

When the opening degree of the intake air valve 160 is decreased, the amount of intake air introduced into the combustion chamber is decreased. However, when the opening degree of the swirl valve 170 is decreased, the amount of intake air introduced into the combustion chamber is practically unchanged and the intake air is just caused to swirl.

FIG. 1 roughly shows an installation position of the swirl valve 170. FIGS. 3 to 5 are cross-sectional views illustrating the swirl valve 170 provided to any one of two branch flow channel 114, according to the first embodiment of the present invention.

The cam plate 200 is provided with the first cam slot 210 and is installed to be rotatable.

The cam plate 200 is structured to rotate about the rotational shaft 202. According to the first embodiment of the present invention, the rotational shafts 162, 172, and 202 for the intake air valve 160, swirl valve 170 and cam plate 200 are arranged in parallel with each other. This structure is illustrated in FIGS. 3 to 5. In addition, preferably, all of the rotational shafts 162, 172, and 202 are perpendicular to the stream of intake air.

The cam plate 200 may be made from various materials and may take various forms. The cam plate 200 is provided with the first cam slot 210. The first cam slot 210 is a groove formed in the cam plate 200. Alternatively, the groove may be a hole that extends through the cam plate 200 in the thickness direction. Further alternatively, the groove may be a recess that is recessed from one surface of the cam plate 200.

As described below, the cam plate 200 is a rotation medium that transfers driving force of the driver unit 140 to the intake air valve 160 or the swirl valve 170 via the first cam slot 210. The cam plate 200 may be formed as a single plate or may be a combination of a plurality of plates.

In addition, the intake air valve 160 is provided with the first protrusion 166 in a position that is spaced from the rotational shaft 162, and the first protrusion 166 is inserted in the first cam slot 210. In addition, the first cam slot 210 has at least a portion referred to as the first rotation section 212 within which the first protrusion 166 slides upon rotation of the cam plate 200 and rotates about the rotational shaft 162 of the intake air valve 160, so that the intake air valve 160 can be rotated.

The intake air valve 160 is provided with the first protrusion 166 that is spaced from the rotational shaft 162, and the first protrusion 166 and the intake air valve 160 rotate together. A rotation axis of the first protrusion 166 and the rotational shaft 162 of the intake air valve 160 agree with each other.

The first protrusion 166 is formed to be inserted in the first cam slot 210. When the cam plate 200 is rotated, the first protrusion 166 slides along the first cam slot 210. At this point, the first protrusion 166, which slides along the first cam slot 210, can rotate about the rotational shaft 162 of the intake air valve 160, depending on the form (or curvature) of the sliding path of the first cam slot 210.

Specifically, when the first cam slot 210 takes a certain form (or curvature), during rotation of the cam plate 200, an inside surface of the first cam slot 210 pushes a side surface of the first protrusion 166, and thus the position of the first protrusion 166 with respect to the rotational shaft 202 of the cam plate 200 changes such that the first protrusion 166 can rotate. When the first protrusion 166 simply slides, its position does not always change with respect to the rotational shaft 202 of the cam plate 200.

In embodiments, since the first protrusion 166 is inserted in the first cam slot 210, when the cam plate 200 is rotated, the first protrusion 166 slides along the first cam slot 210. The sliding motion of the first protrusion 166 can be shown as rotational motion that is made about the rotational shaft of the intake air valve 160 in certain conditions. The rotational motion of the first protrusion 166 eventually results in rotation of the intake air valve 160.

On the other hand, depending on the form of the sliding path of the first cam slot 210, there is a case in which the first protrusion 166 inserted in the first cam slot 210 slides along the sliding path of the first cam slot 210 but does not rotate about the rotational shaft 162 of the intake air valve 160. For example, when a portion of the first cam slot 210 has an arc shape whose center point is the rotational shaft 202 of the cam plate 200, the first protrusion 166 that slides along the sliding path of the arc-shaped portion may not rotate about the rotational shaft 162 of the intake air valve 160. This case will be described below in detail.

FIG. 3 illustrates the reference state in which the opening degree of the intake air valve 160 or the swirl valve 170 is largest and the rotation angle thereof is zero. The rotation angle of the cam plate 200 in this state is defined as zero. The term "reference state" in embodiments of the present invention means a state in which the opening degree of the intake air valve 160 or the swirl valve 170 is largest (in other words, the intake air valve 160 or the swirl valve 170 is maximally or fully open) and in which the rotation angle of the intake air valve 160, swirl valve 170 or cam plate 200 is zero.

Referring to FIG. 3, it is shown that the intake air valve 160 is maximally open and the first protrusion 166 is inserted in the first cam slot 210. The first cam slot 210 may extend in various forms. In embodiments of the present invention, at least a portion of the first cam slot 210 is structured to serve as the first rotation section within which the first protrusion 166 can perform both of the sliding motion and rotational motion.

FIG. 3 illustrates the first rotation section 210 of the first cam slot 210. FIGS. 4 and 5 illustrate the cam plate 200 that is not in the reference state but in a controlled state in which the cam plate 200 is rotated from its initial position.

Specifically, FIG. 4 illustrates a state in which the cam plate 200 is rotated and thus the first protrusion 166 slides along the first rotation section 212.

Although described in detail below, the first and second directions for rotation of the rotational shaft may be freely set. In embodiments of the present invention, for the sake of convenient description, a clockwise direction is referred to as the first direction and a counterclockwise direction is referred to as the second direction.

Figure 6:
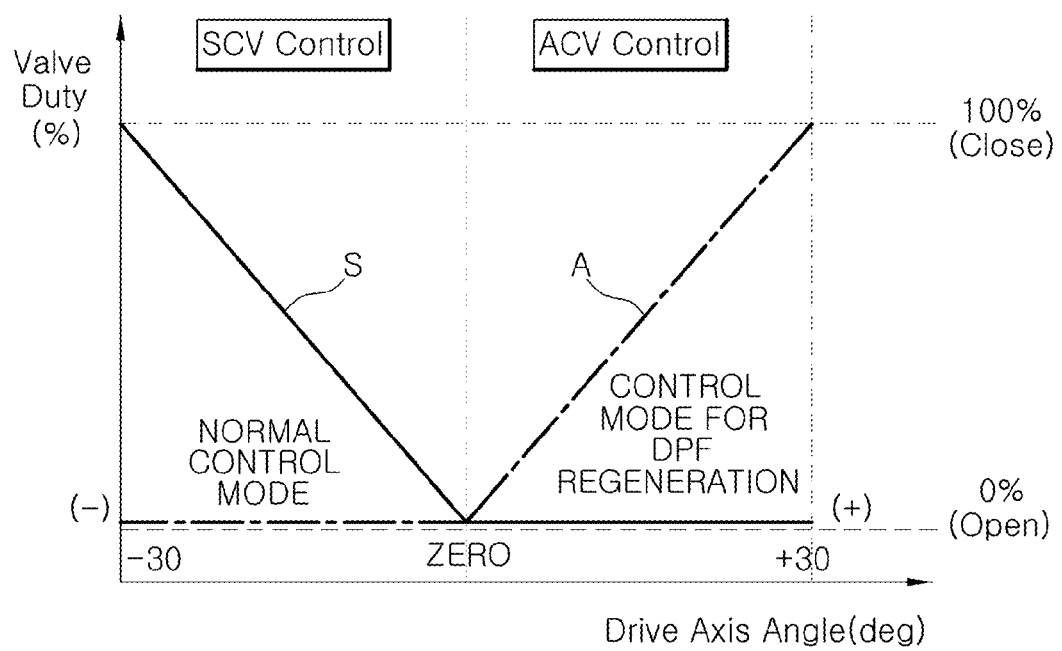
FIG. 6 is a graph illustrating changes in the opening degrees of the intake air valve and the swirl valve in accordance with rotation angles of the cam plate, in the intake air control device for a vehicle according to the first embodiment of the present invention.

When the cam plate 200 is rotated about the rotational shaft 202 in the clockwise direction from the state of FIG. 3, the cam plate 200 becomes the state shown in FIG. 4. This state can be phrased as "the cam plate 200 is rotated in the first direction from the reference state". In the graph of FIG. 6, the first direction of the rotation of the cam plate 200 is denoted by the sign "+".

Meanwhile, when the cam plate 200 is rotated in the counterclockwise direction from the reference state, the cam plate 200 becomes the state shown in FIG. 5. This state can be phrased as "the cam plate 200 is rotated in the second direction from the reference state". In the graph of FIG. 6, the second direction of the rotation of the cam plate 200 is denoted by the sign "−".

As described above, the first direction and the second direction are arbitrarily set for sake of convenient description. Therefore, the directions may be reversed to each other. However, when the first direction and the second direction are reversed to each other, the position of the first rotation section 212 has to be changed and the signs "+" and "−" of FIG. 6 have to be exchanged with each other.

In short, according to embodiments of the present invention, at least a portion of the first cam slot 210 functions as the first rotation section 212 that is formed such that, when the first protrusion 166 slides along the first rotation section 212, the first protrusion 166 may rotate or may not rotate depending on the rotation angle or rotation direction of the cam plate 200.

In addition, as for the first rotation section 212 of the first cam slot 210, the rotation angle of the first protrusion 166 that slides along the first rotation section 212 can be adjusted to vary, for the same rotation angle of the cam plate 200, depending on settings of the extended direction or length of the first cam slot 210.

Embodiments of the present invention are preferably provided with the cam plate 200 rotated by the driver unit 140, and the first protrusion 166 is made to rotate and slide along the first cam slot 210 formed in the cam plate 200, in accordance with the rotation of the cam plate 200. Therefore, with a simple action of adjusting the rotation angle of the driver unit 140, it is possible to adjust the rotation angle of the intake air valve 160 or determine whether to rotate the intake air valve 160.

Advantages effects of this method are verified by referring to the graph of FIG. 6. FIG. 6 illustrates the graph showing changes in the opening degree of the intake air valve 160, which changes in accordance with the rotation angle of the cam plate 200 as shown in FIG. 3.

When the cam plate 200 is rotated from the reference state and thus when the first protrusion 166 slides along the first rotation section 212, the first protrusion 166 is forced to rotate about the rotational shaft 162 of the intake air valve 160. In this case, the intake air valve 160 is rotated and thus the opening degree of the intake air valve 160 is decreased as shown in FIG. 4. The changes in the rotation angle of the cam plate 200 and in the opening degree of the intake air valve 160 are shown in FIG. 6.

In the embodiment of the present invention shown in FIG. 6, when the rotation angle of the cam plate 200 in the first direction is increased, the intake air valve 160 is rotated such that the opening degree thereof is decreased. In FIG. 6, the vertical axis indicates the closing degree, which is contrary to the opening degree. Therefore, 100% on the vertical axis means that the closing degree is 100% and the opening degree is 0%. The closing degree of the intake air valve 160 is indicated by a line A.

In FIG. 6, the horizontal axis indicates the rotation angle of the cam plate 200. The sign "+" means the rotation angle of the cam plate 200 in the first rotation direction and the sign "−" means the rotation angle of the cam plate 200 in the second rotation direction.

These definitions are only for illustrative purposes. Therefore, when the first direction is defined as the counterclockwise direction instead of the clockwise direction, the sign "−" may represent a rotation angle in the first direction instead of a rotation angle in the second direction in FIG. 6. However, the basic concept and content of the invention do not change according to these definitions.

Referring to FIG. 6, when the rotation angle of the cam plate 200 in the first direction is increased from zero, the closing degree of the intake air valve 160 is increased. This means that, when the cam plate 200 is rotated in the first direction, the first protrusion 166 slides along the first rotation section 212.

On the other hand, when the cam plate 200 is rotated in the second direction, the closing degree or opening degree of the intake air valve 160 does not change. In embodiments, by properly setting the shape of the first cam slot 210, it is possible to adjust an amount of rotation of the intake air valve 160 or determine whether to rotate the intake air valve 160 or not, with respect to the same rotation angle of the cam plate 200.

In addition, by properly adjusting the curvature or extended direction of the first rotation section 212 of the first cam slot 210, it is possible to correlate the rotation angle of the cam plate 200 with the rotation angle of the intake air valve 160.

For example, when the first rotation section 212 is formed to have a certain curvature, in a state in which the closing degree of the intake air valve 160 is 100% and the rotation angle of the intake air valve 160 is 90°, the cam plate 200 can be rotated only by an angle of 30°.

In embodiments, by setting the curvature of the first rotation section 212 of the first cam slot 210 such that the rotation angle of the driver unit 140, which rotates the cam plate 200, is decreased and the rotation angle of the intake air valve 160 is increased, it is possible to dramatically improve response to changes in the opening degree of the intake air valve 160.

According to embodiments of the present invention, the intake air valve 160 or the swirl valve 170 is not rotated by the driver unit 140. In embodiments, the intake air valve 160 is rotated in response to rotation of the cam plate 200. Therefore, it is possible to simply and variously change the opening degree of the intake air valve 160 and a rotation angle ratio. Therefore, embodiments of the present invention are advantageous in that it is possible to change the opening degree of the intake air valve 160 without complex control.

Meanwhile, as illustrated in FIGS. 1 to 2, in the intake air control device for a vehicle according to the first embodiment of the present invention, each of the branch flow channels 114 is furcated into a plurality of sub-branch flow channels 116, and the sub-branch flow channels 116 communicate with respective combustion chambers in the engine 50.

Specifically, according to embodiments of the present invention, there is a plurality of branch flow channels 114 and each of the branch flow channels 114 is furcated into a plurality of sub-branch flow channels 116. Preferably, the sub-branch flow channels 116, furcated from any one branch flow channel 114, communicate with respectively different combustion chambers.

In addition, as have been described above, according to embodiments of the present invention, the multiple branch flow channels 114 communicate with the same combustion chamber, because the sub-branch flow channels 116 furcated from respectively different branch flow channels 114, among the multiple sub-branch flow channels 116, communicate with the same combustion chamber.

The first embodiment of the present invention will be described below with reference to FIGS. 1 to 2. The number of the branch flow channels 114 furcated from the intake air flow pipe 112 may vary, but in the first embodiment of the present invention, the number of the branch flow channels 114 furcated from the intake air flow pipe 112 is two.

In addition, each branch flow channel 114 is also furcated at the downstream side thereof to form the sub-branch flow channels 116. The number of sub-branch flow channels 116 furcated from one branch flow channel 114 may vary, but in the first embodiment of the present invention, each branch flow channel 114 is furcated into four sub-branch flow channels 116.

In addition, preferably, the sub-branch flow channels 116 furcated from one branch flow channel 114 communicate with respective different combustion chambers. In the first embodiment illustrated in FIGS. 1 to 2, four sub-branch flow channels 116 communicate with four combustion chambers, respectively.

In this case, the sub-branch flow channels 116 furcated from respectively different branch flow channels 114 communicate with the same combustion chamber. Thus, the multiple branch flow channels 114 communicate with each of the multiple combustion chambers.

According to embodiments of the present invention, the intake air flow channel 110 includes the multiple branch flow channels 114, each of which is furcated into multiple sub-branch flow channels 116, and the sub-branch flow channels 116 furcated from respectively different branch flow channels 114 communicate with respectively different combustion chambers of the engine 50. In embodiments, the sub-branch flow channels 116 furcated from respectively different branch flow channels 114 communicate with the same combustion chamber, meaning that the multiple branch flow channels 114 can communicate with the same combustion chamber.

According to the first embodiment of the present invention that has been described, the amount of intake air introduced into all of the combustion chambers of the engine 50 can be adjusted by using the swirl valve 170, which is provided to any one of the branch flow channels 114 to adjust the amount of intake air in the corresponding branch flow channel 114.

Furthermore, even though only one swirl valve 170 is provided, when the closing degree of the swirl valve 170 is largest (that is, when the swirl valve 170 is maximally or completely closed), the intake air is swirled in all of the combustion chambers of the engine 50.

Due to the structure described above, even though an engine is provided with multiple combustion chambers, intake air can be swirled in all of the combustions chambers by one swirl valve 170. For this reason, as for the intake air control device according to embodiments of the present invention, the structure can be effectively simplified and the weight and cost can be reduced.

On the other hand, it also can be clearly understood that the amount of intake air in all of the combustion chambers of the engine 50 can be adjusted through adjustment of the opening degree of the intake air valve 160 provided to the intake air flow pipe 112.

Meanwhile, as illustrated in FIGS. 3 to 4, in the intake air control device for a vehicle according to the first embodiment of the present invention, the first rotation section 212 of the first cam slot 210 is formed such that the distance from the rotational shaft 202 of the cam plate 200 to the first rotation section 212 varies according to positions in the longitudinal direction thereof. Therefore, the first protrusion 166 can rotate while sliding along the first rotation section 212.

Specifically, the distance of the first rotation section 212 of the first cam slot 210 with respect to the rotational shaft 202 of the cam plate 200 varies according to positions in the longitudinal direction thereof. In other words, the first rotation section 212 is curved to deviate from an arc that has a center point at the rotational shaft 202 of the cam plate 200.

In this case, a change in the rotation angle of the intake air valve 160 is proportional to a change in the distance from the first rotation section 212 to the rotational shaft 202 of the cam plate 200. In embodiments, as a change in the distance from the rotational shaft 202 of the cam plate 200 to each point of the first rotation section 212 is increased along the longitudinal direction of the first rotation section 212, a change in the rotation angle of the intake air valve 160 is increased.

In this case, an increase or decrease in the distance from each point of the first rotation section 212 to the rotational shaft 202 of the cam plate 200 is determined according to a rotation direction of the first protrusion 166.

For example, in the case of FIG. 3, the first rotation section 212 extends such that the distance from each point thereof to the rotational shaft 202 of the cam plate 200 is increased toward an end point thereof in the longitudinal direction. This means that the first protrusion 166 is positioned in the first rotation section 212 such that the first protrusion 166 becomes farther from the rotational shaft 202 of the cam plate 200 while sliding and rotating. In a case in which the first protrusion 166 is first positioned as in FIG. 3 and the first rotation section 212 extends such that a distance from each point thereof to the rotational shaft 202 of the cam plate 200 is gradually decreased toward the end point thereof, although the cam plate 200 is rotated in the first direction, the first protrusion 166 may not rotate. This is because the first protrusion 166 cannot rotate any more to become closer to the rotational shaft 202 of the cam plate 200.

In short, since the curved shape of the first rotation section 212 is designed such that the distance of each point of the first rotation section 212 to the rotational shaft 202 of the cam plate 200 varies, when the cam plate 200 is rotated, the first protrusion 166 slides along the first rotation section 212, and the wall of the first rotation section 212 pushes the side surface of the first protrusion 166, so that the first protrusion 166 is forced to rotate about the rotational shaft 162 of the intake air valve 160 and thus the intake air valve 160 is finally rotated. FIG. 4 illustrates a state in which the first protrusion 166 is rotated from the state of FIG. 3 while sliding along the first rotation section 212.

In addition, as illustrated in FIGS. 3, 4, and 6, in the intake air control device for a vehicle according to the embodiment of the present invention, the first rotation section 212 has a certain curvature by which the rotation angle of the intake air valve 160, which is rotated during sliding of the first protrusion 166, is in a predetermined ratio with respect to the rotation angle of the cam plate 200.

As described above, the first rotation section 212 of the first cam slot 210 can adjust the rotation angle of the first protrusion 166 in accordance with a change in the distance from the first rotation section 212 to the rotational shaft 202 of the cam plate 200. In the first embodiment of the present invention, a change in the distance from each point of the first rotation section 212 to the rotational shaft 202 of the cam plate 200 is set such that the rotation angle of the first protrusion 166 that rotates in the first rotation section 212 is in a predetermined ratio with respect to the rotation angle of the cam plate 200.

The shape of the first rotation section 212 can be determined in various manners. For example, it can be determined through theoretical prediction, simulation models, or the like.

For this matter, the position of the first protrusion 166 at the time at which the first protrusion 166 just enters the first rotation section 212 is important in determining the shape of the first rotation section 212. This will be described in greater detail below.

The first protrusion 166 is a rotating body fixed to the intake air valve 160. In embodiments, the first protrusion 166 rotates about the rotational shaft 162 of the intake air valve 160 while always maintaining a predetermined distance from the rotational shaft 162 of the intake air valve 160.

For this reason, although the distance between the first protrusion 166 and the rotational shaft 202 of the cam plate 200 changes, the distance between the first protrusion 166 and the rotational shaft 162 of the intake air valve 160 is always constant. In addition, the change in the distance between the first protrusion 166 and the rotational shaft 202 of the cam plate 200 is not infinite but is within a predetermined range. This is because both of the cam plate 200 and the rotational shaft 162 of the intake air valve 160 are physically fixed.

A description thereof will be made with reference to FIG. 4. In the embodiment of FIG. 4, the first protrusion 166 that slides along the first rotation section 212 is installed to face the cam plate 200, in the opposite side of the intake air valve 160.

At this point, when the first protrusion 166 rotates, the first protrusion 166 rotates primarily in a direction in which it moves away from the cam plate 200. This is shown in FIG. 4 in which the position of the first protrusion 166 differs from that of FIG. 3.

In the embodiment of FIG. 4, within the first rotation section 212, the first protrusion 166 rotates to gradually move away from the cam plate 200. Therefore, the first rotation section 212 is formed such that the distance of each point of the first rotation section 212 from the rotational shaft 202 of the cam plate 200 is increased as the point becomes farther from the starting point of the first rotation section 212 in the longitudinal direction. Examples of the shape of the first rotation section 212, which enables such an operation, are shown in FIGS. 3 and 4.

When the first protrusion 166 that slides along the first rotation section 212 in FIG. 3 or 4 is disposed on the upstream side (left side in the drawing) of the intake air valve 160, the first protrusion 166 rotates to come close to the rotational shaft 202 of the cam plate 200. In this case, the first rotation section 212 is shaped such that the distance from each point thereof to the rotational shaft 202 of the cam plate 200 is decreased toward the end point thereof in the longitudinal direction.

In embodiments, the length of the first rotation section 212 varies according to the position of the first protrusion 166 at that time.

The curvature of the first rotation section 212 or in which shape the first rotation section 212 extends may be determined in terms of design considerations. For example, according to the first embodiment of the present invention, the curvature is determined such that the rotation angle of the intake air valve 160 is in a predetermined ratio with respect to the rotation angle of the cam plate 200.

This can be verified by referring to FIG. 6. FIG. 6 illustrates one of the various embodiments of the present invention. With reference to FIG. 6, when the cam plate 200 is rotated by a rotation angle of 30° in the first direction, the closing degree of the intake air valve 160 becomes 100%.

The closing degree of 100% of the intake air valve 160 preferably means that the rotation angle of the intake air valve 160 is 90°. In addition, the closing degree of the intake air valve 160 of FIG. 6 changes at a predetermined gradient. This is because the rotation angle of the intake air valve 160 is increased in a predetermined ratio with respect to the rotation angle of the cam plate 200.

However, the ratio of the rotation angle of the intake air valve 160 with respect to the rotation angle of the cam plate 200 shown in FIG. 6 is an example, and those skilled in the art will appreciate that the ratio can vary as desired.

In conclusion, the first embodiment of the present invention features that the curvature of the first rotation section 212 is determined such that the rotation angle of the intake air valve 160 is in a predetermined ratio with respect to the rotation angle of the cam plate 200. This enables easy and precise control of the opening degree, the closing degree, or the rotation angle of the intake air valve 160.

Meanwhile, as illustrated in FIGS. 3, 5, and 6, as for the intake air control device for a vehicle according to the embodiment of the present invention, at least a portion of the first cam slot 210, other than the first rotation section 212, serves as a first non-rotation section 214 that is formed such that the distance of each point thereof to the rotational shaft 202 of the cam plate 200 is constant, along the longitudinal direction of the first non-rotation section 214 so that the first protrusion 166 may not rotate while it slides along the first non-rotation section 214.

As described above, in the first embodiment of the present invention, when the first protrusion 166 slides along the cam slot within the first rotation section 212, as the distance to the rotational shaft 202 of the cam plate 200 changes, the wall of the cam slot pushes the side surface of the first protrusion 166 at a certain point to make the first protrusion 166 rotate about the rotational shaft. However, as for the first non-rotation section, since the first cam slot 210 maintains a constant distance with respect to the rotational shaft 202 of the cam plate 200, the wall of the first cam slot 210 does not push the side surface of the first protrusion 166, so that the first protrusion 166 does not rotate while sliding along the cam slot within the non-rotation section.

In the embodiment of the present invention, as described above, at least a portion of the first cam slot 210 is provided as the first non-rotation section 214 within which the distance of each point thereof to the rotational shaft 202 of the cam plate 200 is constant, thereby not causing rotation of the first protrusion 166 while the first protrusion 166 is sliding.

Normally, the flow rate of intake air can be variously adjusted according to driving conditions of a vehicle. According to the first embodiment of the present invention, due to the presence of the non-rotation section by which the opening degree of the intake air valve 160 is not changed even when the cam plate 200 is rotated, various controls on the flow of intake air can be achieved.

This control may be used in the following case. In embodiments, in the case of controlling a certain device through operation of the cam plate 200, the cam plate 200 needs to be rotated to activate the device. In this case, the opening degree of the intake air valve 160 needs to be constantly maintained.

The first embodiment of the present invention may be useful in situations such as the above-described one. Since the opening degree of the intake air valve 160 can be fixed even when the cam plate 200 is rotated, it is possible to accomplish highly flexible and diverse controls on the opening degree of the intake air valve 160 using the cam plate 200.

FIG. 5 illustrates a state in which the first protrusion 166 is positioned within the first non-rotation section 214. The state of FIG. 5 is made when the cam plate 200 is rotated from the reference state of FIG. 3. Compared with the state of FIG. 3, FIG. 5 shows that the cam plate 200 is rotated but the intake air valve 160 is maintained in the reference state.

Referring to FIG. 6, there is a region within which the rotation angle of the cam plate 200 is changed but the opening degree of the intake air valve 160 is unchanged. This is one embodiment of various embodiments. This is the case in which the cam plate 200 is rotated from the reference state in the second direction. This state is a state in which the first protrusion 166 slides along the first non-rotation section 214.

According embodiments of to the present invention, since the first cam slot 210 includes the first rotation section 212 and the first non-rotation section 214, even when the cam plate 200 is rotated in a certain direction, whether to rotate the first protrusion 166 or how much to rotate the first protrusion 166 can be freely determined. Therefore, highly flexible operation controls can be accomplished.

Meanwhile, as illustrated in FIGS. 3 to 5, in the intake air control device for a vehicle according to the embodiment of the present invention, the swirl valve 170 is provided with a second protrusion or a cam follower 176 in a position that is spaced from the rotational shaft thereof, and the cam plate 200 is provided with a second cam slot 220 in which the second protrusion 176 is inserted. The second cam slot 220 includes a second rotation section 222 within which the second protrusion 176 slides and rotates about the rotational shaft 172 of the swirl valve 170 when the cam plate 200 is rotated and a second non-rotation section 224 within which the second protrusion 176 slides but does not rotate.

Specifically, in the this embodiment of the present invention, the cam plate 200 is provided with both of the first cam slot 210 and the second cam slot 220. The swirl valve 170 is provided with a second protrusion 176 that is spaced from the rotational shaft 172, as in the intake air valve 160.

The second protrusion 176 is inserted in the second cam slot 220. Thus, the second protrusion 176 slides along the second cam slot 220 when the cam plate 200 is rotated.

Like the first cam slot 210, the second cam slot 220 includes the second rotation section 222 within which the second protrusion 176 rotates about the rotational shaft 172 of the swirl valve 170 and the second non-rotation section 224 within which the second protrusion 176 does not rotate so that the rotation angle or opening degree of the swirl valve 170 is maintained.

The characteristics of the second cam slot 220 are not significantly different from those of the first cam slot 210. In this embodiment of the present invention cam plate 200, the first protrusion 166 and the second protrusion 176 slide along the first cam slot 210 and the second cam slot 220, respectively in a state in which the first protrusion 166 and the second protrusion 176 are respectively inserted in the first cam slot 210 and the second cam slot 220. Rotations of both of the intake air valve 160 and the swirl valve 170 can be controlled through rotation of the cam plate 200.

According to various embodiments of the present invention, when the cam plate 200 is rotated, the opening degrees of both of the intake air valve 160 and the swirl valve 170 are unchanged but maintained, or the rotation angles of both of the intake air valve 160 and the swirl valve 170 are changed, or the rotation angle of any one of the intake air valve 160 and the swirl valve 170 is changed. In addition, a change rate of the rotation angle of each of the intake air valve 160 and the swirl valve 170 can be adjusted. In embodiments, the control of the intake air control device according to embodiments of the present invention is highly flexible.

In addition, according to the first embodiment of the present invention, it is possible to adjust both of the opening degrees of the intake air valve 160 and the swirl valve 170 using one cam plate 200. Therefore, the intake air control device according to the first embodiment of the present invention has a simpler and lighter structure compared to a case in which a driver unit is used to adjust opening degrees of valves. This is also advantageous in terms of cost reduction.

FIG. 3 illustrates the cam plate 200 provided with the first cam slot 210 and the second cam slot 220, and illustrates the intake air valve 160 and the swirl valve 170 rotated by the cam plate 200. FIG. 4 illustrates an example in which, when the cam plate 200 is rotated, the opening degree of the intake air valve 160 is changed but the opening degree of the swirl valve 170 remains unchanged. FIG. 5 illustrates an example in which, when the cam plate 200 is rotated, the opening degree of the intake air valve 160 remains unchanged but the opening degree of the swirl valve 170 is changed.

Meanwhile, as illustrated in FIGS. 3 to 6, in the intake air control device for a vehicle according to the first embodiment of the present invention, when the cam plate 200 is rotated in the first direction from the reference state in which the intake air valve 160 and the swirl valve 170 has a maximum opening degree, the first cam slot 210 is formed such that the first protrusion 166 is positioned within the first rotation section 212 and the second cam slot 220 is formed such that the second protrusion 176 is positioned within the second non-rotation section 224.

As described above, in embodiments of the present invention, the first direction and the second direction respectively correspond to a clockwise direction and a counterclockwise direction, and vice versa. In embodiments, when the clockwise direction is defined as the first direction, the second direction is defined as the counterclockwise direction.

In embodiments, the first direction may be defined as the clockwise direction or the counterclockwise direction. it can be arbitrarily determined. FIGS. 3 to 6 illustrate the embodiment in which the first direction is defined as the clockwise direction.

On the other hand, in the first embodiment of the present invention, when the cam plate 200 is rotated in the first direction from the reference state, the first cam slot 210 is formed such that the first protrusion 166 is positioned within the first rotation section 212, and the second cam slot 220 is formed such that the second protrusion 176 is positioned within the second non-rotation section 224.

In embodiments, in the reference state, the first protrusion 166 is positioned preferably at the end point of the first rotation section 212 of the first cam slot 210. When the cam plate 200 is rotated in the first direction from the reference state, the first protrusion 166 slides along the first rotation section 212 of the first cam slot 210. On the other hand, in the reference state, the second protrusion 176 is positioned preferably at an end point of the second non-rotation section 224 of the second cam slot 220, and thus when the cam plate 200 is rotated in the first direction, the second protrusion 176 slides along the second non-rotation section 224 of the second cam slot 220.

The shapes of the first cam slot 210 and the second cam slot 220 are shown in FIGS. 3 to 5. When the cam plate 200 is rotated in the first direction from the reference state, a portion of the first cam slot 210, within which the first protrusion 166 is positioned, serves as the first rotation section 212, and a portion of the second cam slot 220, within which the second protrusion 176 is positioned, serves as the second non-rotation section 224.

After the cam plate 200 is rotated in the first direction from the reference state of FIG. 3, the intake air control device is in the state of FIG. 4. Referring to FIG. 4, in the case in which the first direction is defined as a clockwise direction according to one embodiment of various embodiments of the present invention, when the cam plate 200 is rotated in the first direction, the first protrusion 166 slides along the first rotation section 212 of the first cam slot 210, so that the opening degree of the intake air valve 160 is changed.

In addition, the second protrusion 176 slides along the second non-rotation section 224 of the second cam slot 220, so that the opening degree of the swirl valve 170 is unchanged. Preferably, since the second protrusion 176 slides along the second non-rotation section 224 from the reference state, the maximum opening degree of the swirl valve 170 is maintained.

According to the first embodiment of the present invention, the first cam slot 210 and the second cam slot 220 are formed such that the first protrusion 166 slides along the first rotation section 212 and the second protrusion 176 slides along the second non-rotation section 224 when the cam plate 200 is rotated in the first direction. In this way, the opening degree of only the intake air valve 160, of the intake air valve 160 and the swirl valve 170, can be adjusted through rotation of the cam plate 200.

Referring to FIG. 6, the closing degree of the intake air valve 160 is gradually increased but the closing degree of 0% of the swirl valve 170 is maintained when the cam plate 200 is rotated in the first direction denoted by the sign "+". The closing degree of the swirl valve 170 is denoted by a line S.

On the other hand, as illustrated in FIGS. 3 to 6, in the intake air control device for a vehicle according to the embodiment of the present invention, when the cam plate 200 is rotated in the second direction from the reference state, the first cam slot 210 is formed such that first protrusion 166 is positioned within the first non-rotation section 214, and the second cam slot 220 is formed such that the second protrusion 176 is positioned within the second rotation section 222.

In the first embodiment of the present invention, when the cam plate 200 is rotated in the second direction from the reference state, the first cam slot 210 is formed such that the first protrusion 166 is positioned within the first non-rotation section 214 and the second cam slot 220 is formed such that the second protrusion 176 is positioned within the second rotation section 222.

In embodiments, in the reference state, the first protrusion 166 is positioned preferably at the end point of the first non-rotation section 214 of the first cam slot 210. Thus, the first protrusion 166 slides along the first non-rotation section 214 when the cam plate 200 is rotated in the second direction. In addition, in the reference state, the second protrusion 176 is positioned preferably at the end point of the second rotation section 222 of the second cam slot 220. Thus, the second protrusion 176 slides along the second non-rotation section 224 when the cam plate 200 is rotated in the first direction.

Meanwhile, according to the first embodiment of the present invention, in the reference state, the first protrusion 166 is positioned preferably at a boundary point between the first rotation section 212 and the first non-rotation section 214, and the second protrusion 176 is positioned preferably at a boundary point between the second rotation section 222 and the second non-rotation section 224.

The shapes of the first cam slot 210 and the second cam slot 220 in this case are shown in FIGS. 3 to 5. When the cam plate 200 is rotated in the second direction from the reference state, a portion of the first cam slot 210, within which the first protrusion 166 is positioned, serves as the first non-rotation section 214, and a portion of the second cam slot 220, within which the second protrusion 176 is positioned, serves as the second rotation section 222.

After the cam plate 200 is rotated in the second direction from the reference state of FIG. 3, the intake air control device becomes the state of FIG. 5. Referring to FIG. 5, in one embodiment of various embodiments of the present invention, when the second direction is defined as a counterclockwise direction and when the cam plate 200 is rotated in the second direction, the first protrusion 166 slides along the first non-rotation section 214 of the first cam slot 210. Thus, the opening degree of the intake air valve 160 is maintained. Preferably, since the first protrusion 166 slides along the first non-rotation section 214 from the reference state, the maximum opening degree of the intake air valve 160 is maintained.

In addition, since the second protrusion 176 slides along the second rotation section 222 of the second cam slot 220, the opening degree of the swirl valve 170 is changed along with rotation of the cam plate 200.

In the embodiment of the present invention, since the first cam slot 210 and the second cam slot 220 are formed such that the first protrusion 166 slides along the first non-rotation section 214 and the second protrusion 176 slides along the second rotation section 222, when the cam plate 200 is rotated in the second direction, the opening degree of only the swirl valve 170, of the intake air valve 160, and of the swirl valve 170, can be adjusted through rotation of the cam plate 200.

Therefore, the first embodiment of the present invention is advantageous in that each of the multiple valves can be individually controlled according to the rotation direction of the cam plate 200. This provides the advantageous effect that a complex control system is not required, the number of driver units 140 can be reduced, and the intake air valve 160 and the swirl valve 170 can be stably controlled.

Referring to FIG. 6, when the cam plate 200 is rotated in the first direction denoted by + direction, the closing degree of the intake air valve 160 is gradually increased but the closing degree of 0% of the swirl valve 170 is maintained. On the other hand, when the cam plate 200 is rotated in the second direction denoted by − direction, the closing degree of 0% of the intake air valve 160 is maintained but the closing degree of the swirl valve 170 is gradually increased. As described above, the rotation direction of the cam plate 200 and the rotation angle change rate of the intake air valve 160 or the swirl valve 170 can be diversely determined.

FIG. 3 illustrates a line K that is an imaginary reference line representing a rotation angle change of the cam plate 200. In embodiments, the line K indicates a state in which the rotation angle of the cam plate 200 is zero.

FIG. 4 illustrates a state in which the cam plate 200 is rotated in the first direction from the reference state of FIG. 3. A line K' indicates how much the cam plate 200 is rotated in the first direction. The rotation angle of the cam plate 200 from the reference state is equal to an angle between the line K and the line K'.

FIG. 5 illustrates a state in which the cam plate 200 is rotated in the second direction from the reference state. Referring to the line K' of FIG. 3, it is possible to determine how much the cam plate 200 is rotated in the second direction.

Meanwhile, as illustrated in FIGS. 3 to 6, in the intake air control device for a vehicle according to the embodiment of the present invention, the first rotation section 212 is curved such that the rotation angle of the intake air valve 160 rotated by sliding motion of the first protrusion 166 is in a predetermined ratio with respect to the rotation angle of the cam plate 200, and the second rotation section 222 is curved such that the rotation angle of the swirl valve 170 rotated by sliding motion of the second protrusion 176 is in a predetermined ratio with respect to the rotation angle of the cam plate 200.

As described above, the rotation angles of the first protrusion 166 and the second protrusion 176 caused by sliding motion thereof are determined depending on the curvatures of the first rotation section 212 and the second rotation section 222. In addition, in the first embodiment of the present invention, the curvatures of the first rotation section 212 and the second rotation section 222 are determined such that the rotation angle of the cam plate 200 is in a predetermined ratio with respect to each of the rotation angles of the intake air valve 160 and the swirl valve 170.

The shapes of the first rotation section 212 and the second rotation section 222 that satisfy the requirements described above are shown in FIGS. 3 to 5. Rotation angle ratios of the intake air valve 160 and the swirl valve 170 with respect to the cam plate 200 may differ from each other but the rotation angle ratio for each valve is constantly maintained.

FIG. 6 shows the closing degrees of the intake air valve 160 and the swirl valve 170, which change in response to sliding motion in the first rotation section 212 and the second rotation section 222. Referring to FIG. 6, when the rotation angle of the cam plate 200 in the first direction (+ direction) is increased, the closing degree of the intake air valve 160 is increased. In this case, the closing degree of the intake air valve 160 is increased at a constant gradient.

On the other hand, when the rotation angle of the cam plate 200 in the second direction (− direction) is increased, the closing degree of the swirl valve 170 is increased. In this case, the closing degree of the swirl valve 170 is increased at a constant gradient.

In summary, according to the first embodiment of the present invention, since the first rotation section 212 and the second rotation section 222 are formed such that the rotation angles of the intake air valve 160 and the swirl valve 170 are changed while maintaining a constant ratio with respect to the rotation angle of the cam plate 200, the intake air valve 160 and the swirl valve 170 can be more precisely controlled.

Meanwhile, as illustrated in FIGS. 1, 3 to 5, and 6, the intake air control device for a vehicle according to the first embodiment of the present invention additionally includes a driver unit 140 that provides rotational force to the cam plate 200 and a controller 150 that adjusts the rotation angle of the cam plate 200 by controlling the driver unit 140. In regeneration mode of a diesel particulate filter (DPF) device 104 provided to an exhaust air flow channel 70, the controller 150 adjusts the opening degree of the intake air valve 160 by adjusting the rotation angle of the cam plate 200 such that the first protrusion 166 slides along the first rotation section 212 and the second protrusion 176 slides along the second non-rotation section 224 of the second cam slot 220. At this point, the controller 150 performs control such that the opening degree of the swirl valve 170 is unchanged.

Specifically, the cam plate 200 receives rotational force from the driver unit 140. As described above, the driver unit 140 may be any one kind selected from various kinds and operated in various ways. For example, the driver unit 140 may be a negative pressure type or the driver unit 140 may be preferably a motor type that can easily control a rotation angle so that the rotation angle of the cam plate 200 can be easily controlled.

Alternatively, one embodiment of the present invention may include the controller 150. The controller 150 adjusts the rotation angle of the cam plate 200 by controlling the operation of the driver unit 140. The controller 150 adjusts the opening degrees of the intake air valve 160 and the swirl valve 170 according to requirements required under a specific driving environment of a vehicle, thereby performing control such that the flow state of intake air responds to the driving environment of the vehicle.

Alternatively, one embodiment of the present invention may include the DPF device 104 provided to the exhaust air flow channel 70. The DPF device 104 is a device that removes incomplete combustion carbon gas or particulate matters among hazardous materials contained in exhaust gas.

The DPF device 104 can be operated in various ways. However, according to one embodiment of the present invention, the DPF device 104 collects particulate matter contained in exhaust air, and undergoes a regeneration process by burning the collected particulate matter when a predetermined amount of particulate matter is collected.

On the other hand, at the start of the regeneration mode of the DPF device 104, the controller 150 rotates the cam plate 200 in such a manner that the opening degree of the intake air valve 160 is decreased and the opening degree of the swirl valve 170 is maintained. Specifically, in one embodiment of the present invention, the cam plate 200 is rotated in the first direction to meet the desired opening degree of the valve.

According to one embodiment of the present invention, in the regeneration mode of the DPF device 104, the amount of intake air is reduced so that a ratio of combustibles such as fuel in exhaust air can be increased, thereby aiding combustion in the DPF device 104.

According to the first embodiment of the present invention, it is not necessary to individually adjust the opening degrees of the intake air valve 160 and the swirl valve 170. In embodiments, in such a manner that the controller 150 controls only the rotation angle of the cam plate 200, the desired rotation angles of the intake air valve 160 and the swirl valve 170 can be obtained.

Specifically, as described above, in the first embodiment of the present invention, the controller 150 rotates the cam plate 200 in the first direction. The rotation angle of the cam plate 200 may be set to any value and determined in consideration of various factors under driving conditions of a vehicle.

When the cam plate 200 is rotated in the first direction, the first protrusion 166 slides along the first rotation section 212 of the first cam slot 210 and thus the opening degree of the intake air valve 160 is decreased. On the other hand, since the second protrusion 176 slides along the second non-rotation section 224 of the second cam slot 220, the maximum opening degree of the swirl valve 170 is preferably maintained.

FIG. 1 illustrates a state in which the DPF device 104 is provided to the exhaust air flow channel 70 according to the first embodiment of the present invention. FIG. 3 illustrates the cam plate 200 in the reference state. FIG. 4 illustrates a state in which the driver unit 140 is activated by the controller 150 so that the cam plate 200 can be rotated in the first direction, thus the opening degree of the intake air valve 160 is reduced and the maximum opening degree of the swirl valve 170 is maintained.

In this state, the amount of intake air introduced into the engine 50 is reduced but swirling of the intake air does not occur. Therefore, a ratio of combustibles in exhaust air is increased, and thus the DPF device 104 is regenerated through regeneration mode of the DPF device 104.

FIG. 6 is the graph showing the state in which the cam plate 200 is rotated in the first direction, the opening degree of the intake air valve 160 is decreased, and the opening degree of the swirl valve 170 is maintained.

In short, the first embodiment of the present invention has an advantageous effect in that it is possible to meet the opening degrees of both the intake air valve 160 and the swirl valve 170, which are required in generation mode, with the controller 150 that controls only one driver unit 140 which adjusts the rotation angle of the cam plate 200.

Meanwhile, as illustrated in FIGS. 1, 3, 5 and 6, in the intake air control device for a vehicle according to the embodiment of the present invention, in normal mode corresponding to usual driving conditions of a vehicle, the controller 150 adjusts the rotation angle of the cam plate 200 such that the first protrusion 166 slides along the first non-rotation section 214 of the first cam slot 210 and the second protrusion 176 slides along the second rotation section 222 of the second cam slot 220. With this control, the opening degree of the intake air valve 160 can be maintained and the opening degree of the swirl valve 170 can be adjusted.

The term "normal mode" in embodiments of the present invention means a situation in which regeneration of the DPF device 104 or a lean NOx trap (LNT) device 102 provided to the exhaust air flow channel 70 is not needed and the flow rate of intake air is adjusted in accordance with driving conditions of a vehicle.

At this point, the controller 150 maintains a constant amount of intake air introduced into the engine 50 by maintaining the same opening degree of the intake air valve 160, and causes swirling of intake air in the combustion chamber by adjusting the opening degree of the swirl valve 170, thereby aiding complete combustion. In embodiments, the controller 150 controls the intake air valve 160 and the swirl valve 170 such that efficiency of combustion of fuel is increased in a normal driving condition.

To this end, the controller 150 rotates the cam plate 200 in the second direction. As described above, when the cam plate 200 is rotated in the second direction, the first protrusion 166 slides along the first non-rotation section 214 of the first cam slot 210 so that the opening degree of the intake air valve 160 can be maintained, and the second protrusion 176 slides along the second rotation section 222 of the second cam slot 220 so that the opening degree of the swirl valve 170 can be adjusted. At this point, preferably the swirl valve 170 is controlled such that the opening degree thereof is decreased from the reference state, which means that the swirl valve 170 has the maximum opening degree.

FIG. 1 illustrates the controller 150 that adjusts the rotation angle of the cam plate 200 by controlling the driver unit 140; FIG. 3 illustrates the cam plate 200, the intake air valve 160, and the swirl valve 170 in the reference state; and FIG. 5 illustrates a state in which the cam plate 200 is rotated in the second direction from the reference state, the opening degree of the intake air valve 160 is maintained, and the opening degree of the swirl valve 170 is decreased compared to that of the reference state.

Referring to FIG. 6, when the cam plate 200 is rotated in the second direction by the controller 150, the closing degree of the swirl valve 170 is increased, and the closing degree of the intake air valve 160 is maintained desirably at 0%.

In short, in a case in which it is necessary to meet the required degree of swirling intake air in the combustion chamber, the degree changing in accordance with driving conditions of a vehicle, by adjusting the opening degree of the swirl valve 170 while maintaining the opening degree of the intake air valve 160, the first embodiment of the present invention performs such control that the controller 150 controls the rotation angle of one cam plate 200 using only one driver unit 140 to control both of the intake air valve 160 and the swirl valve 170. Therefore, the first embodiment of the present invention has an advantageous effect that it is possible to effectively respond to driving conditions of a vehicle.

Meanwhile, as illustrated in FIGS. 7 to 10, in an intake air control device for a vehicle according to another embodiment (second embodiment) of the present invention, at least a portion of the first cam slot 210, other than the portions of the first rotation section 212 and the first non-rotation section 214, serves as a third rotation section 216 within which the first protrusion 166 slides and rotates along with rotation of the cam plate 200. In this embodiment, the first non-rotation section 214 is disposed between the first rotation section 212 and the third rotation section 216.

Specifically, according to the second embodiment of the present invention, the first cam slot 210 has the third rotation section 216 along which the first protrusion 166 slides, in addition to the first rotation section 212 and the first non-rotation section 214.

The features of the third rotation section 216 are similar to those of the first rotation section 212 or the second rotation section 222. In embodiments, the third rotation section 216 extends such that its distance to the rotational shaft 202 of the cam plate 200 varies in accordance with positions in the longitudinal direction thereof, which causes the first protrusion 166 to rotate. In this case, the shape and direction of the curve of the third rotation section 216 may be diversely determined in consideration of a positional relationship with the first protrusion 166.

In addition, the first cam slot 210 is formed such that the first non-rotation section 214 is disposed between the first rotation section 212 and the third rotation section 216. In embodiments, the first protrusion 166 slides along the first rotation section 212 or third rotation section 216, depending on whether the cam 300 is rotated in the first direction or the second direction.

The opening degrees of the intake air valve 160 and the swirl valve 170 can be adjusted in various manners in accordance with driving conditions of a vehicle. There may be a case in which the intake air valve 160 is normally maintained at a maximum opening degree but the opening degree of the intake air valve 60 needs to be changed in specific conditions.

The following is an example of the cases. For example, as in the first embodiment of the present invention in which the opening degrees of the intake air valve 160 and the swirl valve 170 are differently changed in accordance with the rotation directions of the cam plate 200, in a state in which the cam plate 200 is rotated in any one direction of the first direction and the second direction, the swirl valve 170 needs to be rotated but the intake air valve 160 needs not be rotated for a first time, and after that the swirl valve 170 and the intake air valve 160 need to be concurrently rotated when the rotation angle of the swirl valve 170 becomes equal to or larger than a specific angle.

The second embodiment of the present invention has an advantageous effect that it is possible to diversely adjust the rotation angles of the intake air valve 160 and the swirl valve 170 when adjusting the rotation angles of the intake air valve 160 and the swirl valve 170 by changing the rotation directions.

FIGS. 7 to 10 illustrate the second embodiment of the present invention. Specifically, the first cam slot 210 has the first non-rotation section 214 between the first rotation section 212 and the third rotation section 216.

The second embodiment in which the third rotation section 216 is provided is substantially the same as or similar to the embodiment shown in FIGS. 3 to 5 in terms of technical features and concepts, except for addition of the third rotation section 216 in which the first protrusion 166 is rotatable.

Meanwhile, as illustrated in FIGS. 7 to 10, in the intake air control device for a vehicle according to the second embodiment of the present invention, the first cam slot 210 is formed such that the first protrusion 166 is positioned in the first non-rotation section 214 or the third rotation section 216, and the second cam slot 220 is formed such that the second protrusion 176 is positioned in the second rotation section 222 when the cam plate 200 is rotated in the second direction from the reference state in which the intake air valve 160 and the swirl valve 170 have a maximum opening degree.

Specifically, according to the second embodiment of the present invention, when the cam plate 200 is rotated in the second direction, the first protrusion 166 slides along the first non-rotation section 214 or the third rotation section 216 of the first cam slot 210.

When considering the features described above, since the first non-rotation section 214 needs to be disposed between the first rotation section 212 and the second rotation section 222, when the cam plate 200 is rotated in the second direction from the reference state, the first protrusion 166 slides through the first non-rotation section 214 and then enters the third rotation section 216.

While the first protrusion 166 slides along the first non-rotation section 214 or the third rotation section 216, preferably the second protrusion 176 slides along the second rotation section 222 of the second cam slot 220.

In the second embodiment of the present invention, when cam plate 200 is rotated in the first direction, the first protrusion 166 slides along the first rotation section 212 of the first cam slot 210 to adjust the opening degree of the intake air valve 160, and the second protrusion 176 slides along the second non-rotation section 224 of the second cam slot 220 to adjust the opening degree of the swirl valve 170. In embodiments, when the cam plate 200 is rotated in the first direction, the opening degree of the swirl valve 170 can be maintained and only the opening degree of the intake air valve 160 can be adjusted.

In addition, according to the second embodiment of the present invention, when the cam plate 200 is rotated in the second direction, the first protrusion 166 initially slides along the first non-rotation section 214 of the first cam slot 210 so that the opening degree of the intake air valve 160 can be maintained, at the beginning of rotation of the cam plate 200, and the second protrusion 176 slides along the second rotation section 222 of the second cam slot 220 so that the opening degree of the swirl valve 170 can be adjusted at this point. In embodiments, during a period in which the rotation angle of the cam plate 200 is equal to or smaller than a predetermined angle, only the opening angle of the swirl valve 170 can be adjusted while the opening degree of the intake air valve 160 is maintained.

Moreover, according to the second embodiment of the present invention, at the time at which the cam plate 200 is rotated in the second direction by a predetermined rotation angle or larger, the first protrusion 166 slides along the third rotation section 216 of the first cam slot 210 so that the opening degree of the intake air valve 160 can be adjusted, and the second protrusion 176 continuously slides along the second rotation section 222 of the second cam slot 220 so that the opening degree of the swirl valve 170 can be adjusted.

In embodiments, when the rotation angle of the cam plate 200 in the second direction becomes equal to or larger than the predetermined angle, the opening degrees of the intake air valve 160 and the swirl valve 170 can be concurrently controlled.

Figure 7:
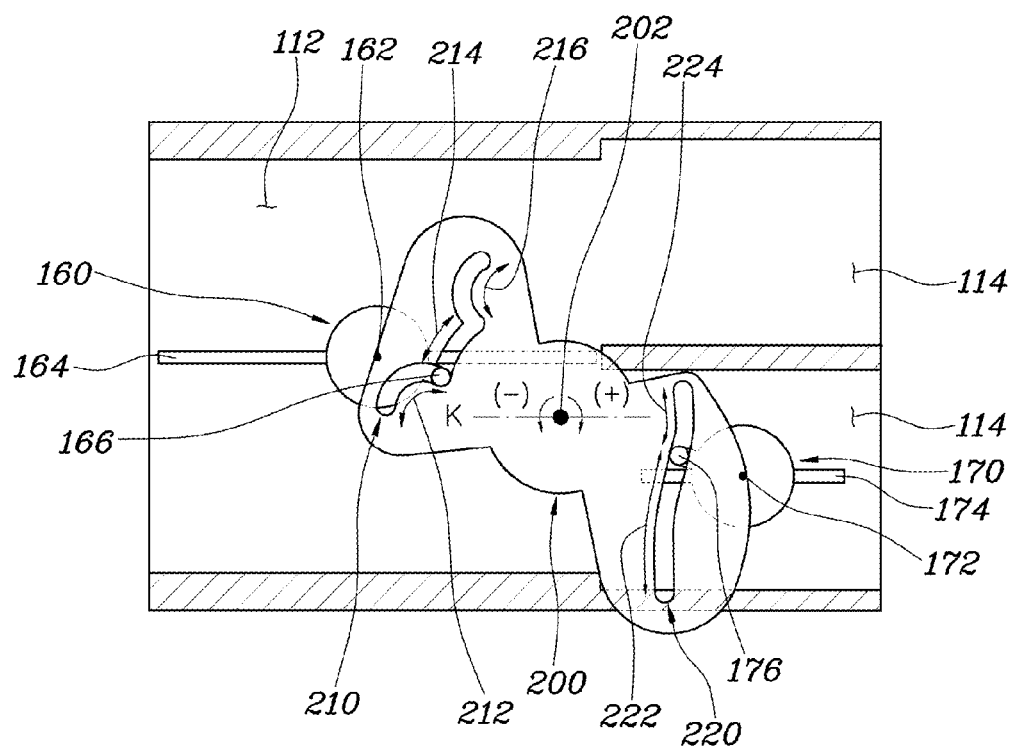
FIG. 7 is a diagram illustrating a reference state of an intake air control device for a vehicle according to a second embodiment of the present invention.

FIG. 7 illustrates a reference state of the cam plate 200 according to the second embodiment of the present invention. A line K is an imaginary reference line showing changes in the rotation angle of the cam plate 200. In embodiments, the line K means a state in which the rotation angle of the cam plate 200 is zero.

Figure 8:
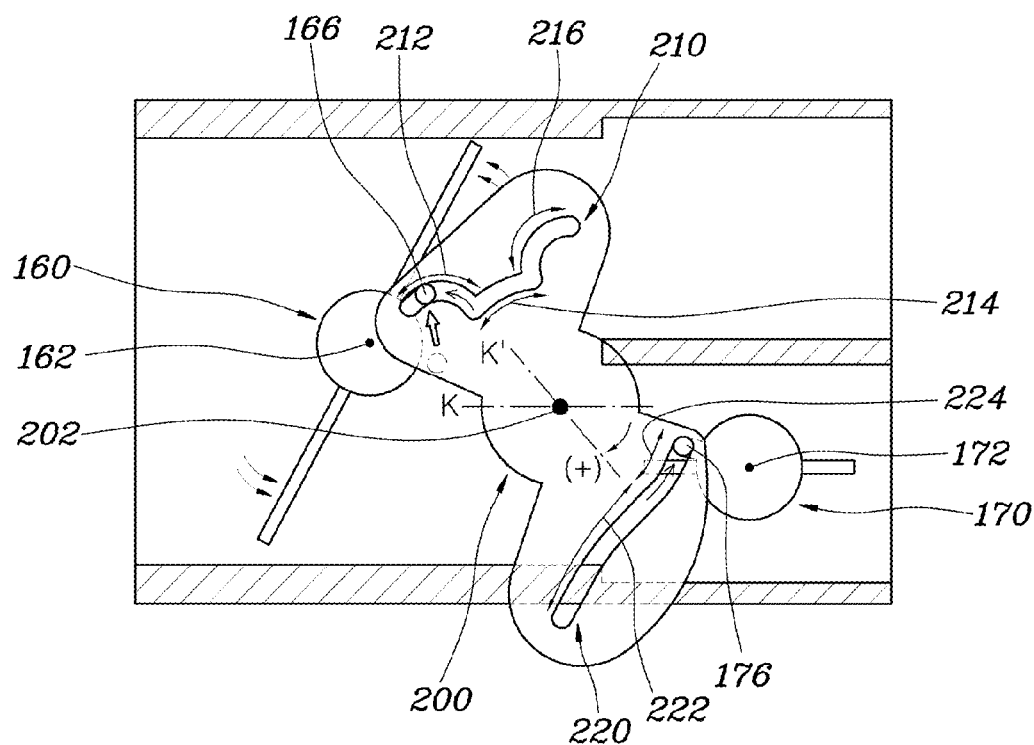
FIG. 8 is a diagram illustrating a controlled state of the intake air control device for a vehicle according to the second embodiment of the present invention, in which a cam plate is rotated in a first direction to adjust an opening degree of an intake air valve.

FIG. 8 illustrates a state in which the cam plate 200 is rotated in the first direction from the reference state of FIG. 7. The opening degree of the intake air valve 160 is decreased but the opening degree of the swirl valve 170 is maintained. In FIG. 8, a line K' indicates how much the cam plate 200 is rotated in the first direction. The rotation angle of the cam plate 200 changed from the reference state corresponds to an angle between the line K and the line K'.

Figure 9:
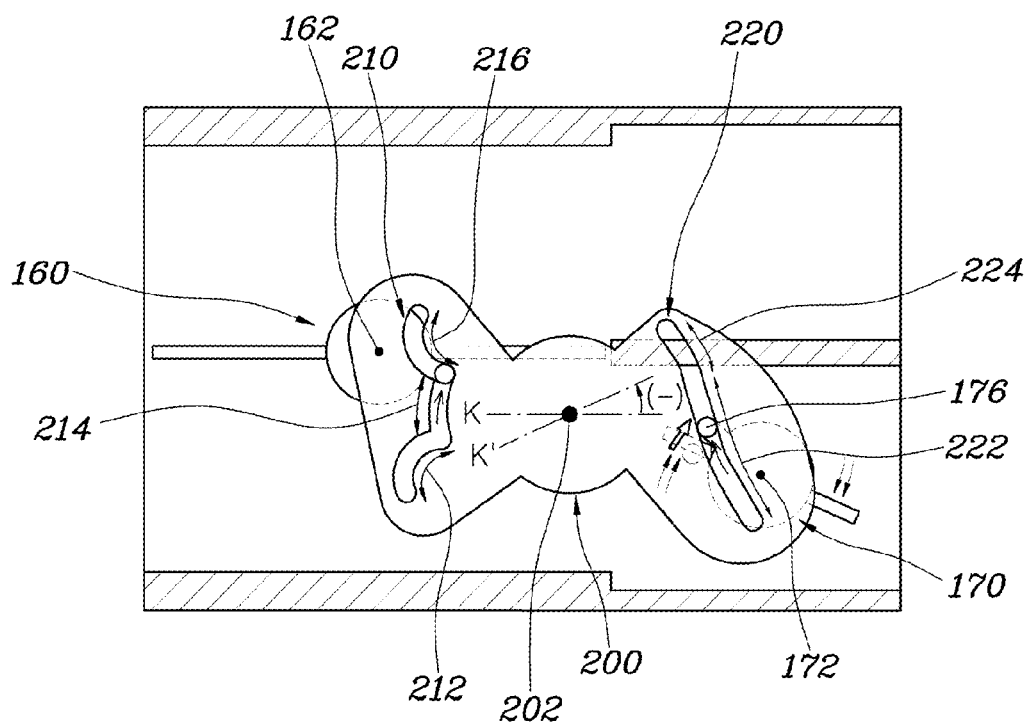
FIG. 9 is a graph illustrating a controlled state of the intake air control device for a vehicle according to the second embodiment of the present invention, in which the cam plate is rotated in a second direction to adjust an opening degree of a swirl valve.

FIG. 9 illustrates a state in which the cam plate 200 is rotated in the second direction from the reference state of FIG. 7. Referring to FIG. 9, the opening degree of the intake air valve 160 is maintained but the opening degree of the swirl valve 170 is decreased. Referring to the line K', it is possible to confirm how much the cam plate 200 is rotated in the second direction.

Figure 10:
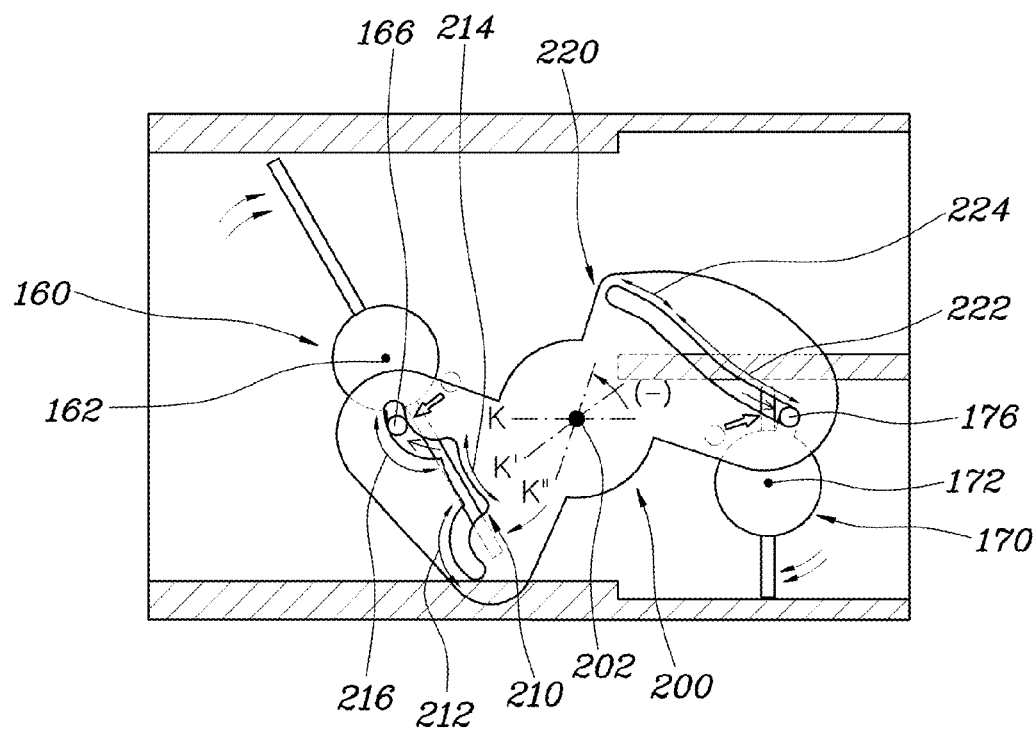
FIG. 10 is a diagram illustrating a controlled state of the intake air control device for a vehicle according to the second embodiment of the present invention, in which the cam plate is rotated in the second direction to adjust both of the opening degrees of the intake air valve and the swirl valve.

FIG. 10 illustrates a state in which the cam plate 200 is further rotated in the second direction than the state of FIG. 9 and thus the first protrusion 166 slides along the third rotation section 216. Both of the opening degrees of the intake air valve 160 and the swirl valve 170 are decreased.

FIG. 10 shows a line K" that represents the rotation angle of the cam plate 200 in the state in which the first protrusion 166 slides along the third rotation section 216 after the rotation angle of the cam plate 200 is increased to be larger than the line K' that represents the rotation angle of the cam plate 200 in the state in which the first protrusion 166 slides along the first non-rotation section 214.

Meanwhile, as illustrated in FIGS. 7 to 11, in the intake air control device for a vehicle according to the second embodiment of the present invention, the second rotation section 222 along which the second protrusion 176 slides is formed such that, as the rotation angle of the cam plate 200 rotated in the second direction from the reference state is increased, the rotation angle of the swirl valve 170 is also increased, but an increase rate thereof gradually decreases.

Specifically, according to the second embodiment of the present invention, when the cam plate 200 is rotated in the second direction, the intake air valve 160 is fixed and only the swirl valve 170 can be rotated. Alternatively, both of the intake air valve 160 and the swirl valve 170 can be concurrently rotated.

However, since both of the states described above consecutively occur, the swirl valve 170 is continuously rotated in a direction in which the rotation angle thereof decreases when the cam plate 200 is rotated in the second direction. In embodiments, the rotation angle of the swirl valve 170 at the time at which the swirl valve 170 stops rotating and when the intake air valve 160 is still fixed, is an initial rotation angle at which both of the intake air valve 160 and the swirl valve 170 start rotating.

In addition, when the first protrusion 166 slides along the first non-rotation section 214 and when the second protrusion 176 slides along the second non-rotation section 224 while the opening degree of the intake air valve 160 is maintained, in order to effectively accomplish the purpose of adjusting only the opening degree of the swirl valve 170 while fixing the intake air valve 160, the change in the opening degree of the swirl valve 170 is preferably as large as possible in the state in which the intake air valve 160 is fixed.

When the cam plate 200 is further continuously rotated in the second direction, the opening degree of the swirl valve 170 is gradually decreased from the time at which the first protrusion 166 slides through the first non-rotation section 214 and then enters the third rotation section 216.

The opening degree of the swirl valve 170 may be continuously decreased from the time at which the first protrusion 166 starts sliding along the third rotation section 216. While the opening degree of the swirl valve 170 which is already greatly decreased approaches zero, the opening degree of the intake air valve 160 is preferably changed from the maximum opening degree to zero. In this case, the concurrent control of the intake air valve 160 and the swirl valve 170 has a meaningful effect.

For this reason, in the second embodiment of the present invention, the curvature of the second rotation section 222 is determined such that an increase rate in the rotation angle of the swirl valve 170 is gradually decreased as the rotation angle is increased, when the cam plate 200 is rotated in the second direction.

In embodiments, when the change in the rotation angle of the swirl valve 170 is set to be relatively large at an early stage of rotation of the cam plate 200 in the second direction, the change in the opening degree of the swirl valve 170 can be increased while the first protrusion 166 is sliding along the first non-rotation section 214.

In addition, when the cam plate 200 is further continuously rotated in the second direction and thus when the first protrusion 166 slides through the first non-rotation section 214 and then enters the third rotation section 216, a change in the opening degree of the swirl valve 170 is decreased. This control increases a change in the rotation angle of the intake air valve 160 with respect to a small change of the rotation angle of the swirl valve 170.

FIGS. 7 to 10 illustrate the second rotation section 222 having the above-described characteristics. Particularly, FIG. 11 is a graph showing the closing degree of the swirl valve 170, which is changed by the second rotation section 222.

Figure 11:
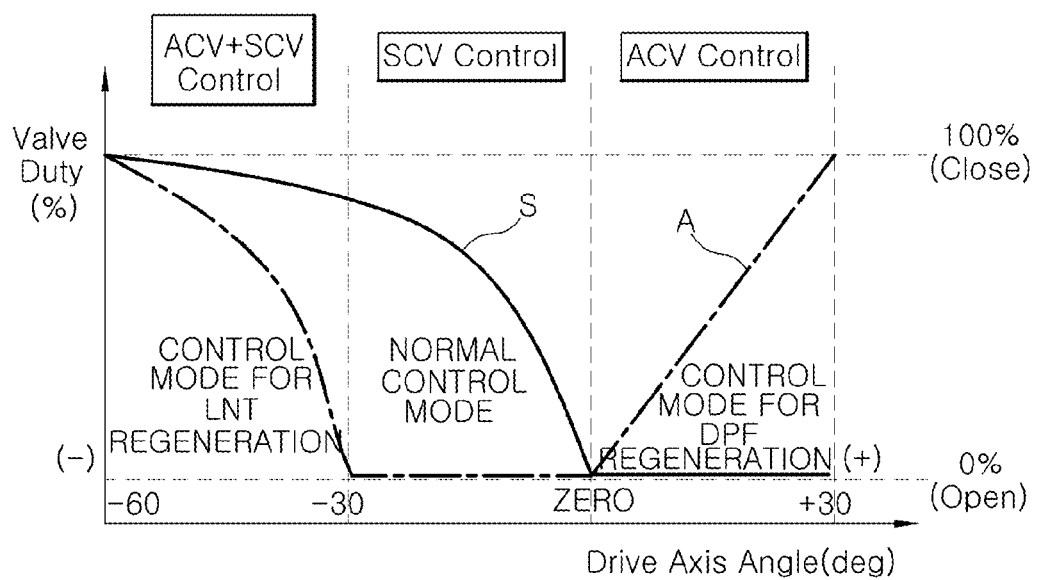
FIG. 11 is a graph illustrating changes in the opening degrees of the intake air valve and the swirl valve in accordance with rotation angles of the cam plate in the intake air control device for a vehicle according to the second embodiment of the present invention.

Referring to FIG. 11, as the rotation angle of the cam plate 200 in the second direction is increased, an increase rate in the closing degree of the swirl valve 170 is gradually decreased. The purpose of this control is to increase the change in the opening degree of the swirl valve 170 in a period during which the opening degree of the intake air valve 160 is maintained and to increase the opening degrees of the swirl valve 170 and the intake air valve 160 to 100% in a period during which the opening degree of the intake air valve 160 is maintained. In FIG. 11, a line A represents the closing degree of the intake air valve 160 and a line S represents the closing degree of the swirl valve 170.

Meanwhile, as illustrated in FIGS. 1, 7, 10, and 11, according to the second embodiment of the present invention, the intake air control device for a vehicle further includes a driver unit 140 that provides rotational force to the cam plate 200 and a controller 150 that adjusts the rotation angle of the cam plate 200 by controlling the driver unit 140. In regeneration mode of an LNT device 102 provided to an exhaust air flow channel 70, the controller 150 adjusts the rotation angle of the cam plate 200 such that the first protrusion 166 slides through the first non-rotation section 214 of the first cam slot 210 and then slides along the third rotation section 216 and the second protrusion 176 slides along the second rotation section 222 of the second cam slot 220, thereby concurrently adjusting the opening degrees of the intake air valve 160 and the swirl valve 170.

Specifically, according to the second embodiment of the present invention, the exhaust air flow channel 70 is equipped with the LNT device 102 that removes hazardous matter. The LNT device 102 is primarily used to reduce incompletely combusted NOx existing in exhaust air.

The controller 150 is set to have a regeneration mode for the LNT device 102. In the regeneration mode of the LNT device 102, the amount of intake air is reduced and the intake air be swirled in the combustion chamber. This may bring about an advantageous effect of reducing incompletely combusted NOx existing in exhaust air during the regeneration mode of the LNT device 102.

Meanwhile, in the regeneration mode of the LNT device 102 described above, to reduce the amount of intake air and cause swirling of intake air, both of the opening degrees of the intake air valve 160 and the swirl valve 170 is reduced compared to the reference state. To this end, the controller 150 rotates the cam plate 200 in the second direction and specifically controls the rotation angle of the cam plate 200 such that the first protrusion 166 can slide along the third rotation section 216 of the first cam slot 210.

As described above, since the second protrusion or cam follower 176 slides along the second rotation section 222 while the first protrusion or cam follower 166 slides along the third rotation section 216, the opening degrees of the intake air valve 160 and the swirl valve 170 can be concurrently adjusted.

In summary, at the beginning of the regeneration mode of the LNT device 102, the controller 150 rotates the cam plate 200 such that the first protrusion 166 can slide along the third rotation section 216, thereby reducing the opening degrees of the intake air valve 160 and the swirl valve 170 to be smaller than those in the reference state. Thus, the requirements for the regeneration mode of the LNT device 102 can be satisfied.

The LNT device 102 provided to the exhaust air flow channel 70 is illustrated in FIG. 1. FIG. 10 illustrates a state in which the cam plate 200 is rotated from the reference state of FIG. 7 so that the first protrusion 166 can slide along the third rotation section 216.

Referring to FIG. 11, when the cam plate 200 is rotated in the second direction and thus when the rotation angle of the cam plate 200 becomes equal to or larger than a predetermined angle, the closing degrees of the intake air valve 160 and the swirl valve 170 are concurrently adjusted. In this case, specific change rates of the closing degrees of the intake air valve 160 and the swirl valve 170, and the rotation angle of the cam plate 200, at which the opening degrees of the intake air valve 160 and the swirl valve 170 start being changed, can be variously set according to designs.

In embodiments, referring to FIGS. 1-11, a vehicle includes an air intake pipe 112 and two or more branched pipes 114 connected to the air intake pipe 112 for receiving air from the air intake pipe 112. Each of the branched pipes 114 is further connected to a plurality of additionally-branched pipes 116, each of which is connected to one of the cylinders or combustion chambers of a diesel engine 50 of the vehicle. The vehicle includes a first valve or air intake valve 160 for controlling air flow in the air intake pipe 112 and a second valve or swirl valve 170 for controlling one of the two or more branched pipes 114. In one embodiment, no valve is provided in at least one of the two or more branched pipes 114. In embodiments, at least one of the two or more branched pipes does not have a valve that cooperatively operates with the first and second valves 160 and 170.

In embodiments, the vehicle includes a cam body 200 including both a first cam profile 210 engaged with a first cam follower 166 of the first valve 160 and a second profile 220 engaged with a second cam follower 176 of the second valve 170 such that a single movement of the cam body 200 can control the movement of both first and second valves 160 and 170. In one embodiment, the cam body 200 is a single piece cam plate. In another embodiment, the cam body 200 has two or more pieces which are fixed to each other and are not movable relative to each other. Thus, locations of the first and second cam profiles relative to each other are not changed when the cam body 200 moves.

In embodiments, each of the cam profiles 210 and 220 includes a first section for controlling the valves 160 and 170 in a normal driving mode and a second section for controlling the valves 160 and 170 in a DPF regeneration driving mode. In embodiments illustrated in FIGS. 7 to 11, each of the cam profiles 210 and 220 further includes a third section for controlling the valves 160 and 170 in a LNT regeneration driving mode. In one embodiment, the first, second and third sections are connected without any additional section therebetween. In one embodiment, the first section is located between the second and third sections. In embodiments, the first section includes at least a portion that does not cause to move the first valve while the cam body 10 rotates. The second section includes at least a portion that does not cause to move the second valve while the cam body 10 rotates. In embodiments, the third section does not include a portion that does not cause to move the first and second valves while the cam body 10 rotates.

Although embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An intake air control device for a vehicle, the device comprising:
    an intake air flow channel including an air flow pipe through which intake air flows, the air flow pipe being furcated into a plurality of branch flow channels that is in fluid communication with a same combustion chamber;
    an intake air valve provided to the air flow pipe and configured to adjust an opening degree of the air flow pipe in accordance with a rotation angle thereof;
    a swirl valve provided to one of the plurality of branch flow channel and configured to adjust an opening degree of the branch flow channel in accordance with a rotation angle thereof; and
    a cam plate that is rotatably installed and is provided with a first cam slot;
    wherein the intake air valve is provided with a first protrusion in a position that is spaced from a rotational shaft thereof, the first protrusion being inserted in the first cam slot, and wherein at least a portion of the first cam slot serves as a first rotation section along which the first protrusion slides and within which the first protrusion rotates about the rotational shaft of the intake air valve in response to rotation of the cam plate, so that the intake air valve is rotated.

2. The intake air control device for a vehicle according to claim 1, wherein each of the branch flow channels is furcated into a plurality of sub-branch flow channels, and the sub-branch flow channels are in fluid communication with respective combustion chambers formed in an engine.

3. The intake air control device for a vehicle according to claim 1, wherein the first rotation section of the first cam slot is shaped such that a distance from the rotational shaft of the cam plate to the first rotation section gradually varies according to positions in a longitudinal direction of the first rotation section, so that the first protrusion rotates while sliding along the first rotation section.

4. The intake air control device for a vehicle according to claim 3, wherein the first rotation section is curved such that a rotation angle of the intake air valve, rotated by sliding motion of the first protrusion, is in a predetermined ratio with respect to a rotation angle of the cam plate.

5. The intake air control device for a vehicle according to claim 1, wherein at least a portion of the first cam slot, other than the first rotation section, serves as a first non-rotation section along which the first protrusion slides but within which the first protrusion does not rotate, and wherein the first non-rotation section is formed such that a distance from the rotational shaft of the cam plate to the first non-rotation section is constant at any positions, for the entire range of the first non-rotation section in a longitudinal direction.

6. The intake air control device for a vehicle according to claim 5, wherein
    the swirl valve is provided with a second protrusion in a position spaced from the rotational shaft of the swirl valve, the cam plate is provided with a second cam slot in which the second protrusion is inserted, and the second cam slot includes a second rotation section along which the second protrusion slides and within which the second protrusion rotates about the rotational shaft of the swirl valve in response to rotation of the cam plate, and a second non-rotation section along which the second protrusion slides but within which the second protrusion does not rotate.

7. The intake air control device for a vehicle according to claim 6, wherein when the cam plate is rotated in a first direction from a reference state in which the intake air valve and the swirl valve have a maximum opening degree, the first protrusion is positioned within the first rotation section of the first cam slot, and the second protrusion is positioned within the second non-rotation section of the second cam slot.

8. The intake air control device for a vehicle according to claim 7, wherein, when the cam plate is rotated in a second direction from the reference state, the first protrusion is positioned within the first non-rotation section of the first cam slot, and the second protrusion is positioned within the second rotation section of the second cam slot.

9. The intake air control device for a vehicle according to claim 8, wherein the first rotation section is curved such that a rotation angle of the intake air valve, rotated by sliding motion of the first protrusion, is in a predetermined ratio with respect to a rotation angle of the cam plate, and the second rotation section is curved such that a rotation angle of the swirl valve, rotated by sliding motion of the second protrusion, is in a predetermined ratio with respect to a rotation angle of the cam plate.

10. The intake air control device for a vehicle according to claim 8, further comprising:

a driver unit that provides rotational force to the cam plate; and a controller that adjusts a rotation angle of the cam plate by controlling the driver unit;

wherein in a regeneration mode of a DPF device provided to an exhaust air flow channel, the controller controls the rotation angle of the cam plate such that the first protrusion slides along the first rotation section and the second protrusion slides along the second non-rotation section of the second cam slot, thereby adjusting an opening degree of the intake air valve and maintaining an opening degree of the swirl valve.

11. The intake air control device for a vehicle according to claim 10, wherein in normal mode corresponding to a normal driving condition of a vehicle, the controller controls the rotation angle of the cam plate such that the first protrusion slides along the first non-rotation section of the first cam slot and the second rotation angle slides along the second rotation section of the second cam slot, thereby maintaining the opening degree of the intake air valve but adjusting the opening degree of the swirl valve.

12. The intake air control device for a vehicle according to claim 8, wherein at least a portion of the first cam slot, other than the first rotation section and the first non-rotation section, serves as a third rotation section along which the first protrusion slides and within which the first protrusion rotates in response to the rotation of the cam plate, and wherein the third rotation section is disposed between the first rotation section and the third rotation section.

13. The intake air control device for a vehicle according to claim 12, wherein, when the cam plate is rotated in the second direction, from the reference state in which the intake air valve and the swirl valve have a maximum opening degree, the first protrusion is positioned within the first non-rotation section or the third rotation section of the first cam slot, and the second protrusion is positioned within the second rotation section of the second cam slot.

14. The intake air control device for a vehicle according to claim 13, wherein the second rotation section along which the second protrusion slides is curved with a curvature by which the rotation angle of the swirl valve is increased but an increase rate of the rotation angle is gradually decreased, as the rotation angle of the cam plate, rotated in the second direction from the reference state, is increased.

15. The intake air control device for a vehicle according to claim 13, further comprising:

a driver unit that provides rotational force to the cam plate; and a controller that adjusts the rotation angle of the cam plate by controlling the driver unit;

wherein in regeneration mode of an LNT device provided to the exhaust air flow channel, the controller adjusts the rotation angle of the cam plate such that the first protrusion slides through the first non-rotation section of the first cam slot and then slides along the third rotation section, and the second protrusion slides along the second rotation section of the second cam slot, thereby adjusting the opening degrees of both of the intake air valve and the swirl valve.

* * * * *